(12) United States Patent
Singh

(10) Patent No.: US 12,125,151 B2
(45) Date of Patent: Oct. 22, 2024

(54) SYSTEMS AND METHODS FOR CREATING A CUSTOM SECONDARY CONTENT FOR A PRIMARY CONTENT BASED ON INTERACTIVE DATA

(71) Applicant: Rovi Guides, Inc., San Jose, CA (US)

(72) Inventor: Mona Singh, Cary, NC (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/709,078

(22) Filed: Mar. 30, 2022

(65) Prior Publication Data

US 2023/0316662 A1 Oct. 5, 2023

(51) Int. Cl.
| | |
|---|---|
| G06Q 30/02 | (2023.01) |
| G06F 3/01 | (2006.01) |
| G06Q 30/0241 | (2023.01) |
| G06Q 30/0251 | (2023.01) |
| G06Q 30/0601 | (2023.01) |
| G06T 19/00 | (2011.01) |

(52) U.S. Cl.
CPC ............ *G06T 19/006* (2013.01); *G06F 3/011* (2013.01); *G06F 3/013* (2013.01); *G06Q 30/0269* (2013.01); *G06Q 30/0277* (2013.01); *G06Q 30/0639* (2013.01); *G06Q 30/0633* (2013.01); *G06Q 30/0641* (2013.01)

(58) Field of Classification Search
CPC ........ G06T 19/006; G06F 3/011; G06F 3/013; G06F 3/017; G06F 3/167; G06F 2203/011; G06Q 30/0639; G06Q 30/0633; G06Q 30/0641; G06Q 30/0207–30/0277
See application file for complete search history.

(56) References Cited

U.S. PATENT DOCUMENTS

| | | | | |
|---|---|---|---|---|
| 10,063,910 | B1 * | 8/2018 | Yelton | H04N 21/4316 |
| 10,162,308 | B2 * | 12/2018 | Du | G03H 1/28 |
| 10,692,294 | B1 * | 6/2020 | Yeh | A63F 13/355 |
| 11,172,251 | B1 * | 11/2021 | Thomas | H04N 7/152 |
| 11,436,828 | B1 * | 9/2022 | Little | G06Q 40/08 |
| 2012/0101880 | A1 * | 4/2012 | Alexander | G06Q 30/02 |
| | | | | 705/14.5 |

(Continued)

OTHER PUBLICATIONS

Magha, V., et al. "A Comparative Study on Different Image Stitching Techniques," International Journal of Engineering Trends and Technology, 70(4): 44-58 (2022).

*Primary Examiner* — Thuy N Nguyen
(74) *Attorney, Agent, or Firm* — Haley Guiliano LLP

(57) ABSTRACT

Systems and methods for generating secondary content item that includes a first portion that is a reminder of the original interest and a second portion that is content relevant to the original interest are disclosed. The methods provide primary content for the user's consumption. User interest based on a plurality of factors, such as user's gaze, heartbeat, or facial expression, is determined during the user's consumption of the primary content. One or more objects or frames are identified as primary objects or frames of interest. The methods also scan in real-time, real-life objects that are in the field of view of an augmented reality device. A determination that the real-time object is related to the primary object of interest is made. A determination is also made if any environmental or local adjustments need to be made. A secondary content item with any environmental or local adjustments is generated.

21 Claims, 17 Drawing Sheets

First Portion  Second Portion

(56) References Cited

U.S. PATENT DOCUMENTS

| | | | |
|---|---|---|---|
| 2012/0135784 A1* | 5/2012 | Lee | G06T 19/006 |
| | | | 455/556.1 |
| 2014/0245335 A1* | 8/2014 | Holden | H04N 21/44218 |
| | | | 725/12 |
| 2014/0317646 A1 | 10/2014 | Garza et al. | |
| 2016/0314494 A1* | 10/2016 | Dhawan | G06Q 30/0633 |
| 2017/0061642 A1* | 3/2017 | Wang | G06F 40/186 |
| 2017/0085951 A1* | 3/2017 | Singh | H04N 21/47217 |
| 2017/0228774 A1* | 8/2017 | Sallas | G06Q 30/0255 |
| 2017/0249336 A1* | 8/2017 | Rainey | G06Q 10/0635 |
| 2017/0345200 A1* | 11/2017 | Furuya | G06T 11/60 |
| 2019/0140917 A1 | 5/2019 | Henrick et al. | |
| 2019/0303981 A1* | 10/2019 | Teller | G06T 19/006 |
| 2020/0134670 A1* | 4/2020 | Du | G06V 20/40 |
| 2021/0034870 A1* | 2/2021 | Ha | G06T 13/20 |
| 2021/0158809 A1* | 5/2021 | VanBlon | G10L 15/22 |
| 2021/0166270 A1* | 6/2021 | Du | G06Q 30/0261 |
| 2021/0250247 A1 | 8/2021 | Henrick et al. | |
| 2021/0312523 A1* | 10/2021 | Luo | G06V 10/56 |
| 2022/0253907 A1* | 8/2022 | Govindgari | G06V 20/20 |
| 2023/0120964 A1* | 4/2023 | Rykhliuk | G06F 18/24 |
| | | | 345/619 |
| 2023/0260280 A1* | 8/2023 | Kim | G06F 3/011 |
| | | | 345/633 |

* cited by examiner

| | | Primary Content | | Real-Life Object | | | Matching | Secondary Content |
|---|---|---|---|---|---|---|---|---|
| Frame # | Scene # | Object Displayed | Interest detected? | Real-life Object | Real-life scene | Real-Life location | Match Confirmed | Secondary Content |
| 1 | A | None | None | NA | NA | NA | NA | None |
| 2 | B | Polo Jacket, Hat, Winter wear, Car, Houses, and Snow | None | NA | NA | NA | NA | None |
| 3 | C | Gucci Bag | Yes | Umbrella, Beach, Volleyball | Kids playing on beach | Santa Cruz Beach | No | None |
| 4 | D | Red Patagonia jacket | Yes | Blue Patagonia jacket, kid, School playground | Kid playing in school playground | Gold Street, San Jose | Yes | Generated |
| 5 | E | Wilson Basketball and Jordan #23 shirt | Yes | Jogger, Jordan #23 shirt, ear pods | Jogger jogging in the park wearing T-shirt | Tivo Park, San Jose | Yes | Secondary content for T-shirt only |
| 6 | F | Camping Tent | None | NA | NA | NA | NA | None |

| Frame # | Scene | Objects of Interest |
|---|---|---|
| 2 |  | None |
| 4 | 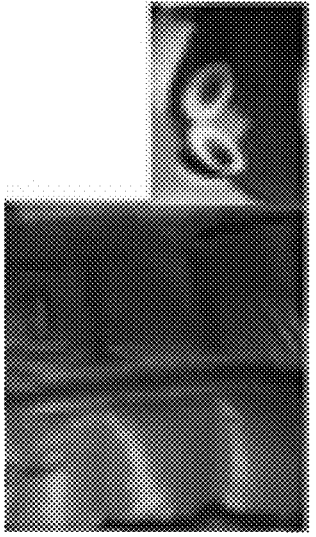 |  |
FIG. 16

SYSTEMS AND METHODS FOR CREATING A CUSTOM SECONDARY CONTENT FOR A PRIMARY CONTENT BASED ON INTERACTIVE DATA

FIELD OF INVENTION

Embodiments of the present disclosure relate to generating secondary media content, such as a video, audio, image, or webpage, for a primary content based on real-time input of real-life objects received through a virtual, augmented, or mixed reality device.

BACKGROUND

Targeted marketing on the internet, including social media platforms, has been a driving force for advertisers to send targeted ads to viewers. This was a leap beyond the former methods of online marketing, which included banner ads or pop-up ads. Targeted marketing works by viewing the user's web surfing or shopping history and recommending more products that fall into the same genre. For example, when you select an item on the Amazon platform such as an Eveready® brand flashlight, Amazon will show ads for several other items that are related, such as other types and brands of flashlights. In some instances, the targeted ads inform the viewer that product Y is being suggested because the viewer had selected product X previously. Such platforms may also track cookies to make such product recommendations.

Although targeted marketing is somewhat effective, it still results in bombarding the user with ads that are not relevant in time. For example, a user searching for the flashlight may have already bought the flashlight by the time the targeted advertisement is delivered to them or may no longer have the need to buy a flashlight. Targeted ads also result in over-advertising to a user, which can backfire by being too intrusive to a user and producing negative impressions of the advertised product or service.

Augmented Reality (AR) promises to provide highly effective ads by placing ads in an active context for the user. However, current AR practices simply copy the same practices used online, such as similar targeted ads placement. As such, current AR marketing also falls short and does not deliver ads that retain the viewer's attention.

AR ads may also provide a large amount of detailed information to the viewer. Since an AR user lacks the ability to browse detailed information in ads, especially when the user is in motion, the user cannot pay attention to complex media such as video clips of ads without risking running into objects or other people.

As such, there is a need for a method for generating secondary content that is effective and delivers content that is contextually relevant to the user based on their interests and previous interactions with such content.

BRIEF DESCRIPTION OF THE FIGURES

The various objects and advantages of the disclosure will be apparent upon consideration of the following detailed description, taken in conjunction with the accompanying drawings, in which like reference characters refer to like parts throughout, and in which:

FIG. 15 is a data structure for determining interest in primary content and generating secondary content, in accordance with some embodiments of the disclosure;

FIG. 16 is an example of identifying an object of interest from the primary content, in accordance with some embodiments of the disclosure.

DETAILED DESCRIPTION

Figure 1:
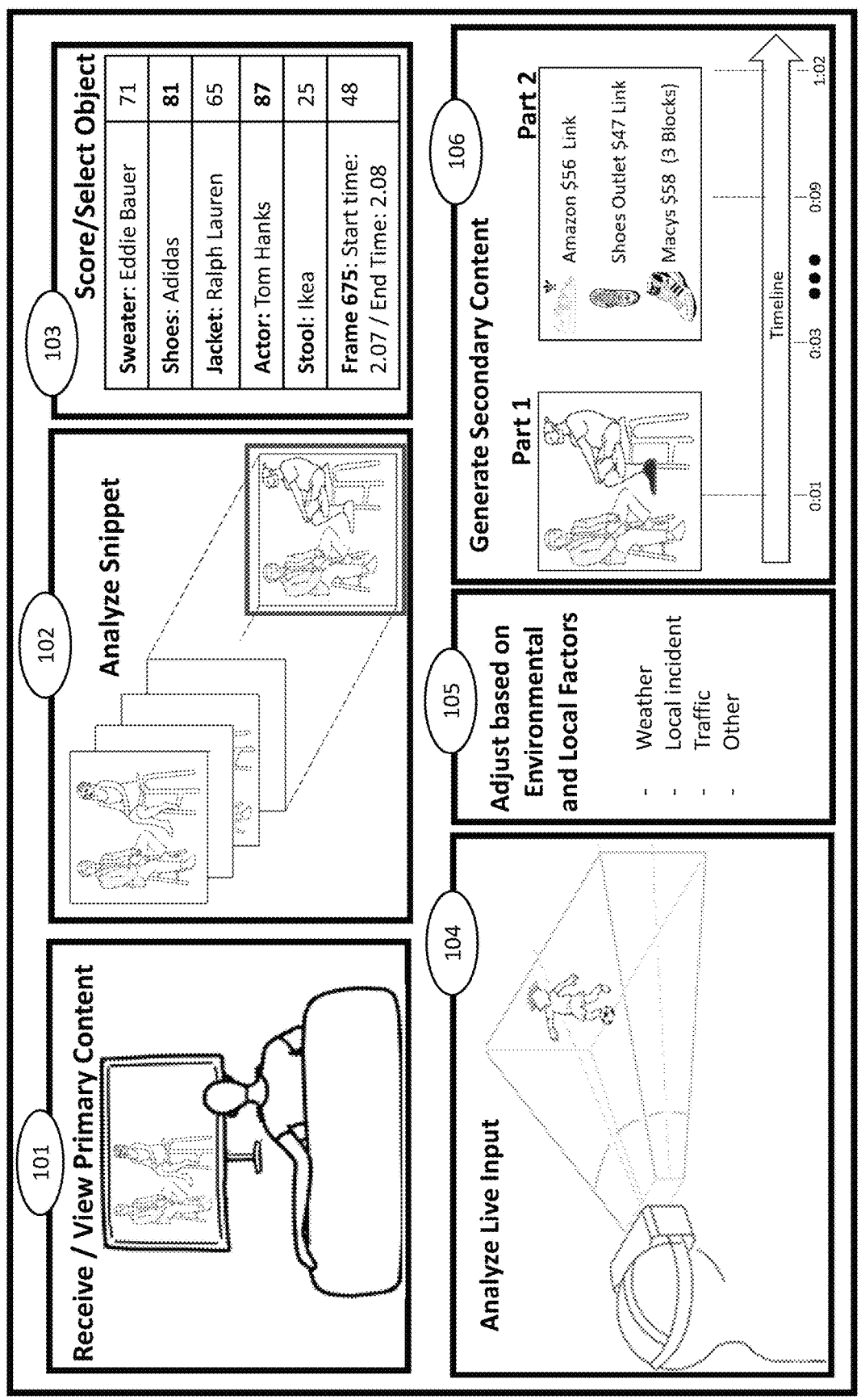
FIG. 1 is a block diagram of an example of a process for generating secondary content based on a combination of primary content and real-life objects, in accordance with some embodiments of the disclosure.

In accordance with some embodiments disclosed herein, some of the above-mentioned limitations are overcome by generating secondary content, such as a video, audio, image, or webpage, for a primary content item based on real-time input of real-life objects received through a virtual, augmented, or mixed reality device.

In some embodiments, the systems and methods described herein are used to generate impactful secondary content by determining the user's interest and associating the determined interest with a real-life setting based on their interactions with real-life objects. This triggers their cognition and memory to bring forth their original interest and then deliver impactful customized secondary content that is presented in a setting that is contextually meaningful and actionable.

To accomplish some of these embodiments, an initial determination is made of the user's interests. The initial determination allows the system to understand what products, services, content, and contexts excite the user and are interesting to them. Without understanding such initial interest, delivering any content would be similar to throwing darts in the dark hoping the user will find interest in one of the pieces of content sent to them.

In some embodiments, primary content is provided to the user and interest in portions of the primary content is determined. The primary content may come in many shapes and forms. These include live broadcasts; on-demand media assets; displays in the virtual reality, augmented reality, or mixed reality device environment; content that can be obtained as a live feed, such as via a camera of a device that shows a real-time view in its field of vision; a website; an online shopping platform or an abandoned cart of the online shopping platform, also referred to as "Saved for later" or refers to them as your shopping cart is empty; data from Internet-of-Things (IoT) devices, such as visual, audio, and textual data; an advertisement or an infomercial; or any complex media object that combines two or more of the above.

The user's interest is gauged based on the user's responses, engagement, or interactions with the primary content. Such responses, engagement, or interactions can be gauged based on the user's gaze directed towards any portion of the primary content. Based on human psychology and medical sciences, if the user is interested in or excited about something shown to them, the user will look at it and perhaps look at it for a longer period of time than other items that are not as interesting. The methods and systems analyze such gaze to determine if the gaze is directed towards any particular portion of the primary content, such as a frame or an object in the frame. For example, the systems herein may use eye gaze trackers or other visualization techniques to track the eyeball movement of the user. Such trackers may use an inward-facing camera of a primary device associated with the user to monitor the user's eyeball movements. They may also use cameras installed in the room where the user is present. If the tracking methods detect the eye movement toward a particular frame or object, or a prolonged view over a predetermined amount of time, then such gaze will be associated with the user having an interest in the displayed frame or object in the frame. In addition to using gaze for determining interest, other mechanisms such as monitoring the heartrate, motion, or facial expressions may also be used to determine interest. These and other interest-determining mechanisms as described in the figures below are used to identify one or more frames or objects that are of interest to the user. When there is more than one object or frame of interest determined, the numbers of interests may be scored to determine priority or ranking of interests.

Charged with an understanding of the user's interest in the primary content, the systems and methods can be deployed to use such user interest data and look for real-life interactions of the user to determine if the user acts upon their interests. Associating initial interests with real-life interactions confirms that the original interest was not just by chance but that the user is actually interested in the objects and the interests are current and relevant to the user.

To look for real-life interactions, a secondary device that is a virtual, augmented, or mixed reality device that is capable of obtaining live real-time input using a camera to capture real-life objects within its field of view is used. The virtual device may be a headset, transparent eyeglasses with a camera, or a mobile phone with AR capabilities. Live input is scanned by the camera of such reality devices to analyze real-life objects and determine whether the user's gaze focuses on any of the real-life objects that are similar to the user's initial interests determined in the primary content. If a user's gaze using the reality equipment determines that the user's gaze in real life is focused on an object that matches or relates to the original interest, then their interest in the object is confirmed based on the real-time interaction. Such real-life interaction and matching with the initial interest triggers a second content generation mechanism to generate a secondary content item.

In some embodiments, the secondary content generated includes two portions. The first portion may be a reminder of a snippet from the primary content where the user showed interest. For example, it may be a highlight frame, also referred to herein as reminder frame, first portion, a reminder snippet, or an extracted portion. The second portion, also referred to as supplemental content, may include content that is context-specific to the primary object, such as a related advertisement, webpage, or purchasing options for the object of interest, that may be received from an advertisement author. The system may also adjust the secondary content based on environmental and local factors, such as weather and traffic.

FIG. 1 is a block diagram of an example of a process for generating a secondary content item based on a combination of the primary content and real-life objects, in accordance with some embodiments of the disclosure.

In one embodiment, at block 101, a primary content item is displayed or captured on a primary electronic device. The primary content can be a live broadcast, such as the news or a live game. The primary content can also be a media asset, such as a TV show, movie, cartoon, documentary, internet clip, or a webpage. The primary electronic device can be a media player, such as a TV; an electronic device having a display, such as a mobile phone, tablet, laptop, or a smartwatch; or a virtual reality, augmented reality, or mixed reality device, such as a headset or transparent eyeglasses, that includes one or more cameras.

In another embodiment, the primary content may be obtained through a live feed. For example, the primary content may be a live feed seen through transparent virtual reality, augmented reality, or mixed reality eyeglasses that show a real-time view in their field of vision. The primary content may be a live feed seen through a headset of a virtual reality, augmented reality, or mixed reality system. The primary content may also be a live feed seen through a mobile phone while its outward facing camera allows its user to see a live image within the camera's field of view.

In another embodiment, the primary content may be obtained through a website, an online shopping platform, or an abandoned cart of the online shopping platform. For example, if a user has browsed a website, data from the website, such as a specific page or an item shown on the website, may be used as primary content. Likewise, if the user has browsed an online shopping platform, clicked on an item on the platform, or added items to a shopping cart of the shopping platform and abandoned the shopping cart, such data may also be used as primary content.

In yet another example, Internet-of-Things (IoT) device data may also be considered primary content. For example, voice input in a listening IoT device, such as Alexa®, owned by Amazon®, or Siri®, owned by Apple®, may be used as primary content. Images, videos, and other data, such as sensing data, obtained by smart home cameras, parking spot cameras, sensors, or devices with sensing abilities, can also be used as primary content.

In another embodiment, the primary content can be an advertisement or an infomercial. The advertisement or infomercial can be a complex media object, e.g., a video clip that lasts several seconds and includes audio or visually complex scenes. It can also be any media content that provides detailed information on a product or service (e.g., what it is, its purpose, benefits, usage, and any disclaimers. Additional discussion relating to a variety of inputs that can be used as primary content can be found in the description of FIG. 7 below.

In one embodiment, at block 102, the primary content is analyzed to determine a snippet of interest (also referred to as an extracted portion). To determine interest, a control circuitry of a system, such as the control circuitry described in FIG. 5, may observe and monitor whether and how the user interacts with the primary content. When the interaction indicates that the user is interested, from this interaction the control circuitry may determine which parts of the primary content are more interesting to the user. Although references are made to control circuitry, the server 402 in FIG. 4 and Ad Server in FIG. 3 may also perform the operations described. As such, a snippet may be identified based on where in the primary content the user showed interest and the level of such interest may also be determined. Data may also be collected on lack of interest in an area of the primary content, which can be used for determining future actions and recommendations, such as what not to include in secondary content.

Figure 14A:
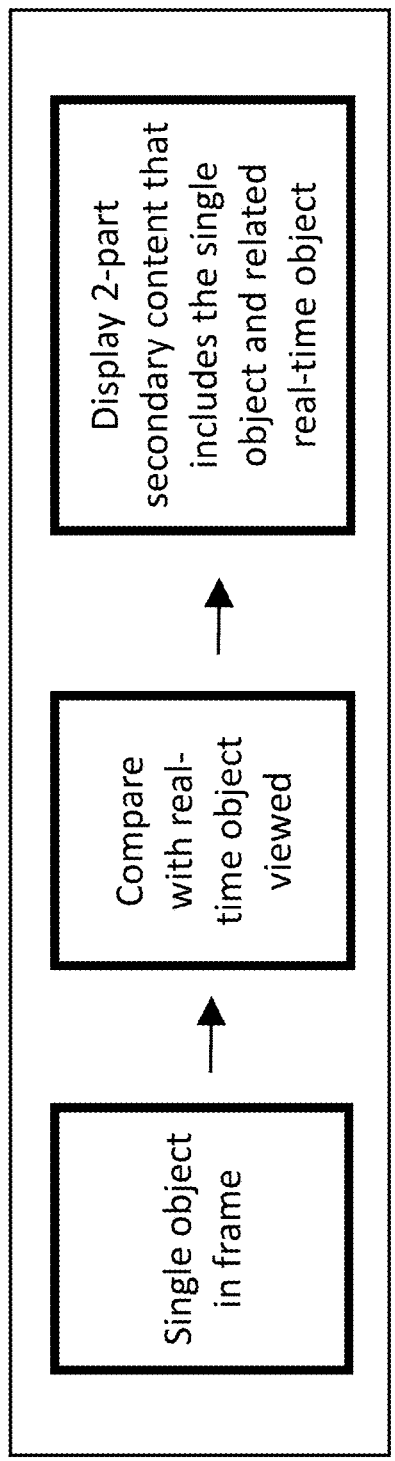
FIG. 14A is a flowchart of a process of generating a two-portion secondary content item when only one object or frame of interest is identified, in accordance with some embodiments of the disclosure.
Figure 14B:
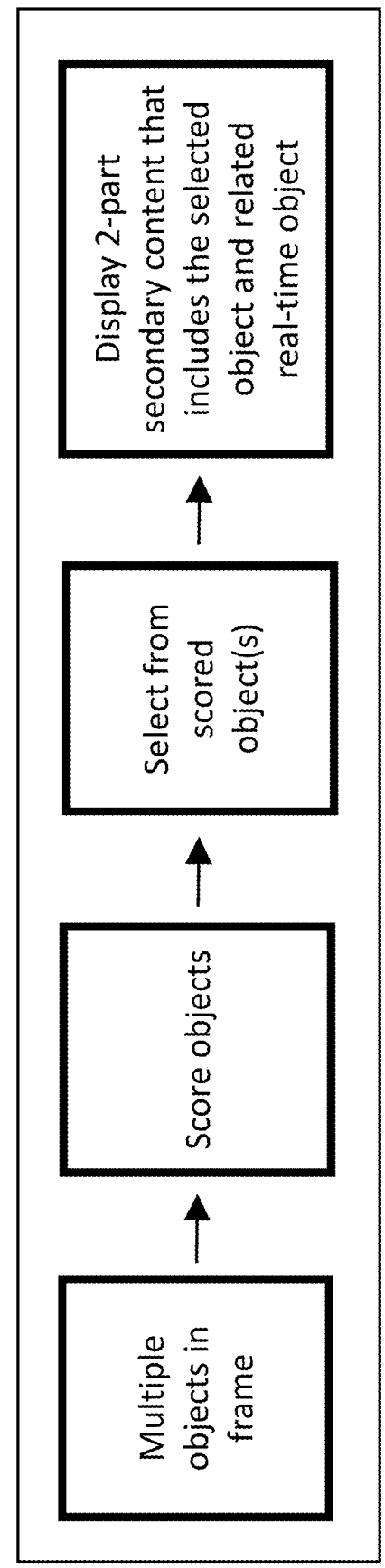
FIG. 14B is a flowchart of a process of generating a two-portion secondary content item when multiple objects or frames of interest are identified, in accordance with some embodiments of the disclosure.

In some embodiments, the primary content may be a video or an advertisement that may range from a few seconds to several minutes long. In such embodiments, a viewer of the primary content may pay attention to only certain frames of the primary content, and more specifically show a higher level of interest in a particular frame or in an object in the particular frame of the video. The control circuitry may monitor the user's gaze throughout the display of the primary content to determine a snippet of interest. Such snippet may also be identified based on when the user's gaze is directed towards the particular frame or an object in the particular frame. For example, if the user is staring at an object in the frame or the user's gaze is directed towards the object in the frame for a threshold period of time, such as 2-3 seconds or any other predetermined duration, then the control circuitry may associate such gaze with an interest in the object in the frame. Although, for simplicity, the user's gaze with respect to a single frame or a single object in the frame is discussed in this example, the control circuitry may associate user interest with multiple frames or multiple objects in a single frame. Further details relating to the processes for single and multiple objects of interest are discussed in relation to FIGS. 14A and 14B. Likewise, although a snippet from a video is discussed in this example, the snippet may be selected from an image, an audio input, a webpage, a shopping cart, or a screenshot of a display.

Since the primary content may come in other forms aside from a video, advertisement, or infomercial, such as a live broadcast, a DVR media asset, a live real-time input, an internet clip, audio input, voice input, or a webpage, the snippets of interest may also vary based on the form of input. For example, the snippet may be a frame or an object in the frame in the primary content, or the snippet may be obtained from a live image captured in real time via a primary camera of a primary electronic device. For example, the control circuitry may monitor a live feed in the camera of a virtual reality, augmented reality, or mixed reality headset or eyeglasses and determine a snippet of interest from such live feed. In another embodiment, the snippet may be obtained from a displayed webpage; an abandoned shopping cart of a webpage; a voice input, image, or video from an Internet-of-things (IoT) device; or an audio input received by the primary electronic device.

As described earlier, gaze of the user is one factor used to analyze which parts of the primary content are more interesting to the user, such as by determining whether and how the user interacts with the primary content based on their gaze or prolonged gaze over a threshold period of time. In addition to gaze, other factors such as a user's heartbeat, motion, voice level, gestures, facial expressions, statements made (verbal or textual) social media comments, and/or texts may also be used to determine user interest. For example, devices such as smartwatches that include heartbeat monitors may monitor the pulse of a user when the user is viewing the primary content, and a change in heartbeat above a threshold when a particular frame is displayed may be associated with the user being excited and used as an input to determine a snippet of interest. Other factors are described in further detail in the discussion of FIG. 8 below.

At block 103, in some embodiments, snippets, e.g., extracted portions, may include multiple frames, objects in the frames, image, webpages, real-time inputs of real-life objects, or other items as mentioned above. There may be a single snippet or multiple snippets that may include one or more objects of interest, also referred to herein as primary objects. At block 103, the control circuitry may calculate a score for each object of interest in the snippets of interest.

In one embodiment, the score may be based on characteristics of the gaze of the user, such as duration of the gaze, repeated gaze, or gaze that exceeds a predetermined threshold of time. The score may also be based on the user's history, such as media asset consumption history and other history associated with user's heartbeat, motion, voice level, gestures, facial expressions, statements made (verbal or textual), social media comments, texts, etc.

As depicted in block 103, a plurality of objects are identified as associated with user interest based on the collection and analysis steps described in blocks 101 and 102. These include a sweater from Eddie Bauer®, shoes from Adidas®, a jacket from Ralph Lauren®, the actor Tom Hanks, and a wooden stool from Ikea®. The control circuitry may calculate the score for each object based any one or more factors mentioned above. The scores may be stored in a database, such as in a table. The control circuitry may select one or more objects based on the calculated scores, such as the object with the highest score, the top two objects with the highest scores, or based on some other preferred or programmed method of selection.

At block 104, in one embodiment, the user may be going about their activities or daily routine in the real world while wearing of a virtual reality, augmented reality, or mixed reality headset or eyeglasses or a mobile phone with AR capabilities. This may include going to the grocery store; watching a baseball game; being at a mall, at work or at a gym; or running; walking; or doing any activity at any location. The virtual reality, augmented reality, or mixed reality headset or eyeglasses may include a camera, such as an outward-facing camera. Although any type of wholly or partially computed reality, such as virtual reality, augmented reality, or mixed reality, can be used by the embodiments described herein, for the sake of simplicity, augmented reality or AR may be used as an example. The camera of the AR headset or glasses may be used to scan and capture a live input of the user's surrounding that are in the field of view of the AR camera. For example, if the user is wearing the AR headset or glasses and walking around their neighborhood, the camera may capture kids playing soccer, or other families walking around the neighborhood, including the items of clothing worn by the kids and the families, such as types of jackets, shoes, and any objects carried with them.

In some embodiments, the AR device may be the same device as the primary electronic device used in blocks 101 and 102, and in other embodiments, the AR device may be a separate device from the primary electronic device. For example, in one embodiment, when the AR device is the same device as the primary electronic device, distinct modes may be selected for different operations. These include a mode for consuming primary content and a mode for performing as an AR device to capture real-life objects in real time.

The camera of the AR device may be used to scan the live input in real time. The scanning may be performed on a continuous basis or on a periodic basis. The scanning may also be performed when a motion or change in surroundings is detected. The scanning by the camera may identify and capture real-life objects in the field of view that bear relevance to the snippet or a selected object identified in the snippet based on the calculated score in block 103. The real-life objects may be identified based on a variety of techniques, such as by using computer vision applied on the field of view to identify the real-life objects that are relevant to snippet or the scored objects from the primary content.

In one embodiment, for each real-life object scanned, the control circuitry may determine its relevance to the snippet (i.e., extracted portion) identified previously through blocks 101-103. For example, the control circuitry may continue scanning all real-life objects until an object that is relevant to one of the objects in block 103 is identified. In one scenario, as depicted in block 104, the scanning of the live input in the field of view of the camera may capture a boy playing soccer. The camera of the AR device may also capture any details of the boy playing soccer and his surroundings that are visible and in the field of view. These may include the boy's clothes, brand of clothes, shoes, jacket, and any other item of clothing or an object on or around the boy that is in the field of view of the AR camera.

The control circuitry may then match the scanned objects with the primary object scored at block 103. Once a match is determined between the primary object and a real-life scanned object, the control circuitry may generate a secondary content item relevant to the match. In some embodiments, the match may be a perfect (100%) match between the scanned object and the real-life object, and in other embodiments, the match may be determined if it exceeds a predetermined percentage. One example of a 100% match may be that a primary object is an Eddie Bauer sweater that is of a certain pattern and color and a real-life object captured through the AR camera is also an Eddie Bauer sweater that is substantially the same in pattern, color, and all its attributes as the primary object. In another example, the match may be less than 100% if the real-life sweater meets some, but not all, of the attributes of the primary object. For example, the real-life sweater may be an Eddie Bauer sweater but of a different pattern, or the real-life sweater may match the color and style of the primary object but may not be made by Eddie Bauer. Although a "match," either partial or 100% is mentioned above, related content that is in the same genre, realm, or category are also considered. For example, relatedness between the scanned objects and the primary object is analyzed to determine whether the scanned object is related in some way, such by genre, same type of object etc.

Once a match or relevancy between the scanned objects and the primary object is determined, whether it's a 100% match or a match that exceeds a predetermined percentage, then the secondary content that is customized based in part on the match may be generated. The secondary content may either be generated by the control circuitry or obtained from sources such as the producer of the primary content, or from a third-party resource. The secondary content may also be obtained from a vendor or service offered in a metaverse. The secondary content may also be obtained from an advertising server by providing it a frame or a selected object and/or the real-life object data such that an advertisement that takes into account both objects, or the primary object, is generated by the advertising server and provided.

In one embodiment, blocks 105 and 106 describe the generation of the secondary content, also referred to herein as secondary media content. In one embodiment, the secondary content is suitable for augmented reality and is created from a combination of user-specific reminder snippets or primary objects, such as the snippets or objects obtained in blocks 101-103, that were extracted from the primary content along with a product, service, information, an advertisement, a metaverse product, service, game, or other context-specific secondary snippets, media assets, advertisements, websites, internet links provided by the creator of the primary content, generated by the control circuitry, or obtained from third party resource such as an advertisement server.

In one embodiment, the secondary content may consist of two portions or parts. The first portion may be a reminder of the snippet from the primary content obtained through the primary electronic device. The second portion may include content that is related to the primary object, i.e., have some aspect of relatedness to the reminder snippet. The second portion, also referred to as supplemental content, may be an advertisement or additional information, or related to both the primary and the real-life object. In the event the second portion is an advertisement, the advertisement may be received by an advertisement author, such as the Ad author described in block 203 of FIG. 2 or Media plus AR Ad Author in FIG. 3.

The reminder snippets or reminder objects (also referred to as extracted portions) are those snippets and primary objects that were previously identified in block 103 that were based on where in the primary content the user showed an interest. The reminder snippet or the primary object may be shown at the start of the secondary content, or within a predetermined time of the start of the secondary content, to remind the user that the secondary content is being shown to the user because of their initial interest in the object during their viewing of the primary content. Showing such a reminder of the specific object of interest, i.e., the primary object as it was seen by the user, as the first portion of the secondary content ignites the user's cognitive abilities and memory to bring forth the impact of the detailed primary content in a setting where it is contextually meaningful and actionable. This not only has the effect of reminding the user of the primary content and the object of interest in the primary content but also acts as a prequel to the second portion. It does so by informing the user that the second portion is being shown to the user because they showed interest in the primary object thereby making the second portion more impactful when it is relatable by the user, i.e., the user understands that the second portion, such as an advertisement is not random but it is because it has some aspect of relatedness to the primary object and it is because of their original interest in the primary object.

The second portion of the secondary content, which may be received from an Ad author, includes content that is contextually related to the primary object. For example, if the primary object was a jacket, then the second portion of the secondary content may be a website where the jacket can be bought; a plurality of online hyperlinks that include information related to the jacket; or YouTube® videos, reviews, or advertisements that relate the primary object. The second portion of the secondary content may also be a dynamic digital object, such as a video, or a static page, such as a webpage. The second portion may also be information or directions to a store where the jacket may be bought and may integrate into the AR device's GPS to navigate the user to the store if the user accepts the navigational guidance offered.

Generating such a secondary content where the first portion is a reminder of the primary content and the second portion is content, information, advertisement, or some other guidance related to the snippet of interest in the primary content, such as how to buy the product or service associated with an object of interest, is more effective. It has a higher level of impact than simply sending advertisements that are based on user viewing history.

In one embodiment, the two-portion secondary content is customized, and the two portions are stitched together such that they may be viewed as one piece of content. The two-portion secondary content may be displayed in a variety of formats and orientations. For example, the secondary content may be displayed in a sequential manner where the second portion immediately follows the display of the first portion. In another example, the secondary content may be displayed as a picture-in-picture where the reminder frame, highlight frame, or reminder snippet is displayed in a smaller window within a larger window that displays the second portion. In yet another example, the secondary content may be displayed as two frames side by side or by looping between the frames where one frame is the first portion, and the second frame is the second portion of the secondary content. In yet another example, the first portion may be highlighted while the second portion is displayed without a highlight. As depicted in block 106, the shoe is highlighted (e.g., depicted in red) in the first portion (Part 1) while the second portion displays the related advertisements (Part 2) without any highlights. In yet another example, user-interaction is enabled in relation to the primary object, and the second portion may be displayed upon user interaction with the primary object, such as when a user places their computer mouse over the primary object.

The secondary content invokes the user's cognitive abilities and jogs their memory by reminding them of the original frame or object of interest before presenting the second portion, such as an advertisement. This allows the user to draw a conclusion that the secondary content bears some aspect of relatedness to the original frame and increases the probability that the user will have a higher level of meaningful and actionable interaction with the second portion of the secondary content. Such higher level of interaction may also increase the odds for the advertiser or the producer of the secondary portion that their content, product, or service will be noticed and perhaps purchased.

In one embodiment, the secondary content may be adjusted based on environmental and local factors, as depicted in block 105. For example, a ski vacation advertised in blistering summer may sell well by showing scenes of cold and snow, whereas the same ski vacation advertised in the cold or during winter may sell well by showing scenes of hot chocolate in the ski lodge. Likewise, local consideration of the user's circumstances, such as location, busy times, pricing, or membership status may be taken into account in generating the combined secondary content. For example, one store being less busy than another store, or one store being closer or having less traffic to get through to reach, one store having the same product in the user's size or having a lower price, one store awarding more reward points, or one store being a higher-paying advertiser may be some of the factors considered in determining how to adjust the secondary content for the user. Taking such environmental and local factors into account customizes and updates the second portion of the secondary content, making it more appealing to the viewer.

Figure 2:
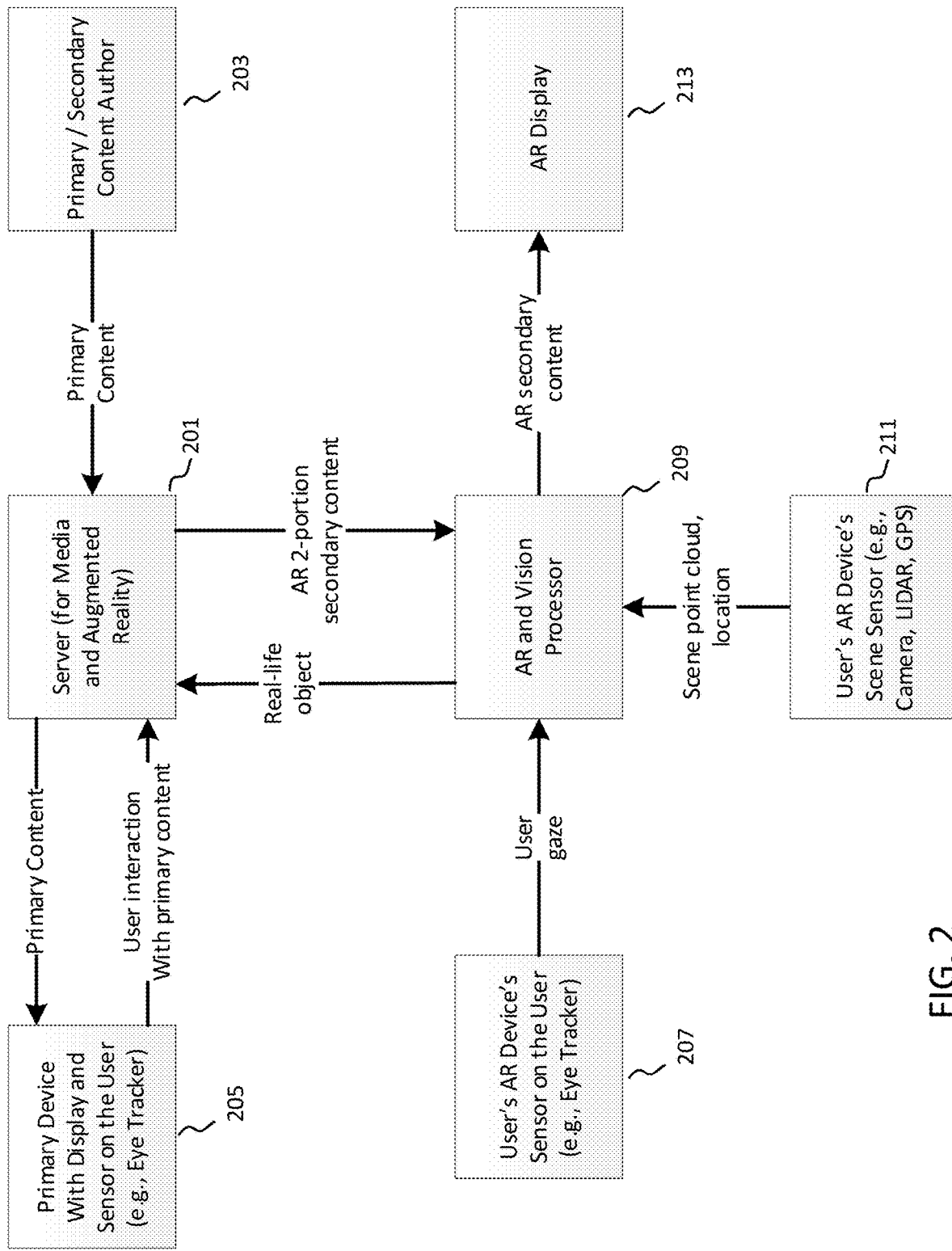
FIG. 2 is a block diagram of various components of a system for generating secondary content, in accordance with some embodiments of the disclosure.

FIG. 2 is a block diagram of various components of a system for generating secondary content, in accordance with some embodiments of the disclosure. In one embodiment, two separate user devices may be used for the processes described in FIG. 1. A first or primary device may be used to display primary content, capture live real-time content, display webpages or online content, such as shopping platforms and abandoned shopping carts, or receive input from IoT devices. The primary device is also one the user uses to consume media, especially video clips of real-time or pre-recorded video streams (such as games or movies). This device may be used when the user is otherwise somewhat passive (such as sitting at home or riding a bus) and able to safely pay attention to the media. The primary device also includes the capability to receive and play back a video and to track the user's interactions with the video, principally interactions that indicate interest, such as user's gaze; user's actions on the video, such as pause, rewind, and play; user's biometric signals, such as heart rate; user's motion; user's gestures and facial expressions; and other detections factors as described in the discussion of FIG. 8 below.

The second or secondary device is a virtual, augmented, or mixed reality-capable device that is capable of obtaining live real-time input using a camera to capture real-life objects within its field of view. The second device must also be able to display virtual, augmented, or mixed reality content in a virtual setting. The secondary device is used while consuming virtual, augmented, or mixed reality content. This device may be used when the user is interacting with the real world, such as when walking through town or riding a bike. The secondary device also includes components such as a camera, for example, an outward-facing camera, LIDAR, and GPS focused on the real world (directed away from the user) that captures what the user views through the secondary device. These components produce information on the real world such as images, point clouds, and location data. The secondary device also includes components such as an eye gaze tracker focused on the user, which identifies where in the real-world is the user's attention directed. It further includes a display through which virtual, augmented, or mixed reality content can be overlaid on the surface of a real-world scene visible to the user through the device.

In another embodiment, the primary and the secondary devices may be the same device capable of handling different modes and functionalities to provide the above-described functions of the primary and the secondary device. In yet other embodiments, additional devices that integrate into one or more devices that are collectively capable of handling different modes and functionalities to provide the functions of the primary and the secondary device are also contemplated.

In one embodiment, the server 201 receives primary content from a content author 203. The content author may be associated with the server, or it may be a third party that is external to the system. The primary content may be an advertisement comprising a primary video. The primary content may also be a media asset, such as a TV show, movie, cartoon, documentary, internet clip, or a webpage. It may also be content that is obtained through a live feed from a mobile phone or augmented reality device camera. It may also be content that is obtained through a website, an online shopping platform, or an abandoned cart of the online shopping platform. Additionally, it may be content obtained from Internet-of-things (IoT) devices, such as audio clips or camera footage.

Once received, the server 201 may then send the primary content to the primary device 205 associated with the user. In some embodiments, the server 201 may select the type of primary content before sending it to the user. For example, the server 201 may apply certain policies that may allow or restrict certain types of primary content for the user. For example, the policy may prevent delivery of primary content to a child if the primary content is rated for an adult. In another example, the server may only allow primary content that has been paid for by the author, such as an advertiser paying for dissemination of their advertisement. Likewise, a plurality of rules may be considered by the server to select from primary content received from the author. The policies may be server-generated or coded by a user of the primary device.

The primary device 205 receiving the primary content may analyze the user's interest in a frame or an object of the primary content. In one embodiment, the control circuitry of the primary device may observe and monitor whether and how the user interacts with the primary content to determine the user's interest. It may consider factors such as user's gaze, user's heartbeat, motion, voice level, gestures, facial expressions, statements made (verbal or textual), social media comments, and/or texts in determining user interest.

When the interaction indicates that the user is interested, from this interaction the control circuitry may determine which parts of the primary content are more interesting to the user and capture such data, which may be a frame of interest or an object of interest within the frame. A highlighted frame or snippet that includes the frame or object of interest may be sent from the primary device 205 to the server 201.

The user may also be using an augmented reality device 207 as the user goes about their real-world activities while wearing a virtual reality, augmented reality, or mixed reality headset or eyeglasses or a mobile phone with AR capabilities. As mentioned above, a headset, eyeglasses, or a mobile phone may be the secondary device that is separate from the primary device, or it may be the same device that is capable of handling different functionalities. The camera of the headset or glasses may be used to scan and capture a live input of the user's surroundings that are in the field of view of the AR camera. For example, an eye tracker that is associated with the user's AR device (also referred to herein as secondary device) may be used to track the user's eyeball movement, i.e., the user's gaze, to determine which real-life objects seen through the AR device the eyeballs are directed towards. Other factors, such as heart rate or user's motion, may also be used in addition to the user's gaze in determining user's interest in the real-life objects seen through the camera of the AR device.

The data relating to the user's interest in the real-life objects seen through the AR camera may be sent to an AR and vision processor 209. The AR and vision processor may include the capability to carry out computer vision processing on scene (given as an image or point cloud) to recognize real-world objects in the scene. This AR and vision processor 209 may also receive the user's location, scene displayed or captured through the AR device's camera, and other data from the AR device's scene sensor 211. Such data may also include data from a camera, LIDAR, or GPS components of the AR scene sensor.

The AR and vision processor 209 may identify which real-life object or objects are in the user's field of view and send such information on those real-life objects to the server. This includes the data obtained through 207 and 211. As such, the server may receive information on both which scene the user is viewing and the real-life object at which the user's gaze was directed (or at which object the user was gazing when a heartbeat or motion occurred).

The server 201 may receive and process the data from the AR and vision processor 209. The processing by the server 201 may include identifying primary content of interest, real-life objects of interest, a match between the primary and real-life objects, scoring of the primary objects, and all other processes described in blocks 101-105 of FIG. 1 to generate secondary content.

As discussed above, the secondary content generated by the server 201 may consist of two portions or parts. The first portion may be a reminder of the snippet from the primary content obtained through the primary electronic device 205, and the second portion may include content that is context-specific to the primary object or to both the primary and the real-life objects. In some embodiments, the trigger mechanism for generating the secondary content may be the viewing of the real-life object that is matched with the original interest in the primary object from the primary content.

The reminder snippets or reminder objects are those snippets and primary objects that were previously identified in block 103 that were based on where in the primary content the user showed an interest. Although they are referred to as snippets, they may also be a highlight frame that captures one or more objects of interest in the primary content. The second portion of the secondary content includes content that is contextually related to the primary object, such as information or directions to a store, physical or online, where the object of interest identified in the primary content can be purchased.

The secondary content may be a segmented reality content that is sent by the server 201 to the AR and vision processor 209. Upon receiving the secondary AR content, the AR and vision processor 209 may determine the placement of the secondary content as augmented reality information and instructs the user's AR device to display it accordingly. For example, the AR and vision processor 209 may direct the AR device to display the secondary content in a sequential manner where the second portion immediately follows the display of the first portion. In another example, the AR and vision processor 209 may direct the AR device to display the secondary content in a picture-in-picture, side by side, or looping between the frames on any other desired format. The AR device may then display it on its display 213 it as directed by the AR and vision processor 209. Although devices 205, 207, 211, 213 are depicted as separate blocks in FIG. 2, one or more of the devices could be the same device, or the functionality of the devices 205, 207, 211, 213 can be distributed in one or more devices. Likewise, server 201 and AR and Vision processor 209 can also be either in separate devices or part of a same device.

Figure 3:
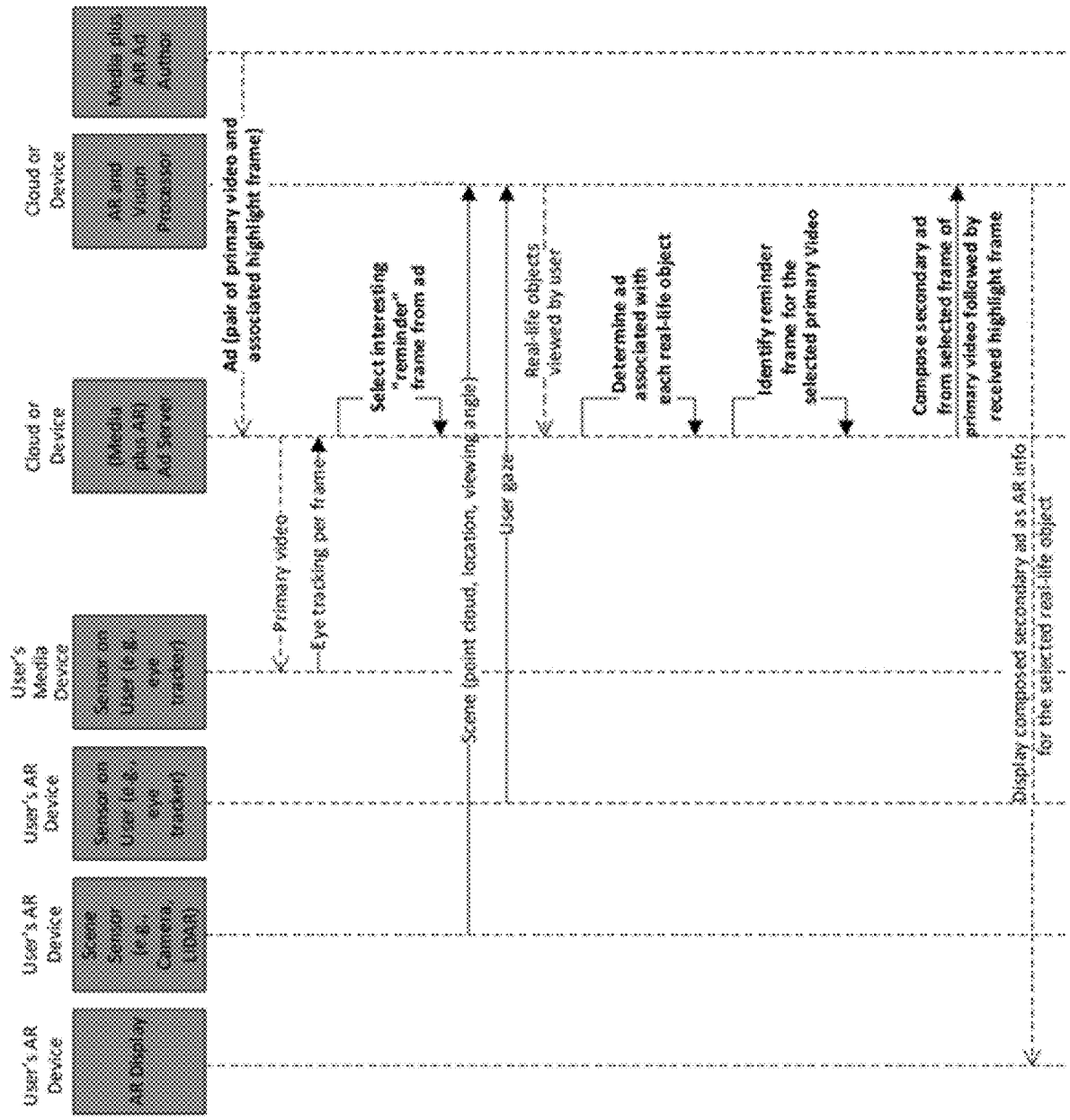
FIG. 3 is a block diagram of communications between different components of the system to generate the secondary content, in accordance with some embodiments of the disclosure.

FIG. 3 is a block diagram of communications between different components of the system to generate the secondary content, in accordance with some embodiments of the disclosure. The communications described in this figure relate to actions performed by the components of the system in FIG. 2. For example, the user's gaze may be communicated from the user's AR or primary device to a cloud or device to determine if the gaze can be associated with user interest.

In one embodiment, as depicted in FIG. 3, an AR Ad author sends an advertisement comprising a primary video and a highlight frame to the Ad Server. Receiving the primary video, the Ad Server selects and sends a primary video, such as a primary advertisement, to the user. The user's media device receives the primary video and starts monitoring the user's engagement with the primary video.

As described above, among several monitoring tools, one of the tools used is the camera associated with the user's media device to monitor the user's gaze as the user consumes the primary video. The user's media device then sends back information about the user's gaze on frames of the primary video to the Ad Server.

The Ad Server selects an interesting "reminder" frame from the primary video for the specific user. The reminder frame is also referred to as the snippet, highlighted frame, or extracted portion herein. The reminder frame is essentially an extracted portion from the primary video that is used as a reminder to the user of that they had previously consumed and is used to show relatedness between the extracted portion and the secondary advertisement.

At some time generally after the selection of the reminder frame, the User's AR device sends to the AR and Vision Processor information on the scene that the user is viewing (e.g., a real-world scene). The User's AR device also sends to the AR and Vision Processor information on the user's eye gaze. In response, the AR and Vision processor identifies which real-life object, or one or more objects are in the user's field of view and sends information on those real-life objects to the Ad Server.

The Ad Server identifies the advertisement relevant to each real-life object. The Ad server also retrieves the reminder frame for that ad for the specific user who has previously consumed the primary video. The Ad server composes a secondary ad from the reminder frame and sends it to the AR and Vision Processor. The AR and Vision Processor determines placement of the secondary ad as AR information and instructs the User's AR device to display it accordingly. Although several client devices, such as AR display, camera, LIDAR, sensors, AR and vision processor, have been mentioned in FIGS. 2 and 3, the functionality of some or all of the user devices may be combined into one or more user devices. Likewise, functionality of some or all of the server side devices such as sever, Ad server, and AR Ad author may also be one or more device.

Figure 4:
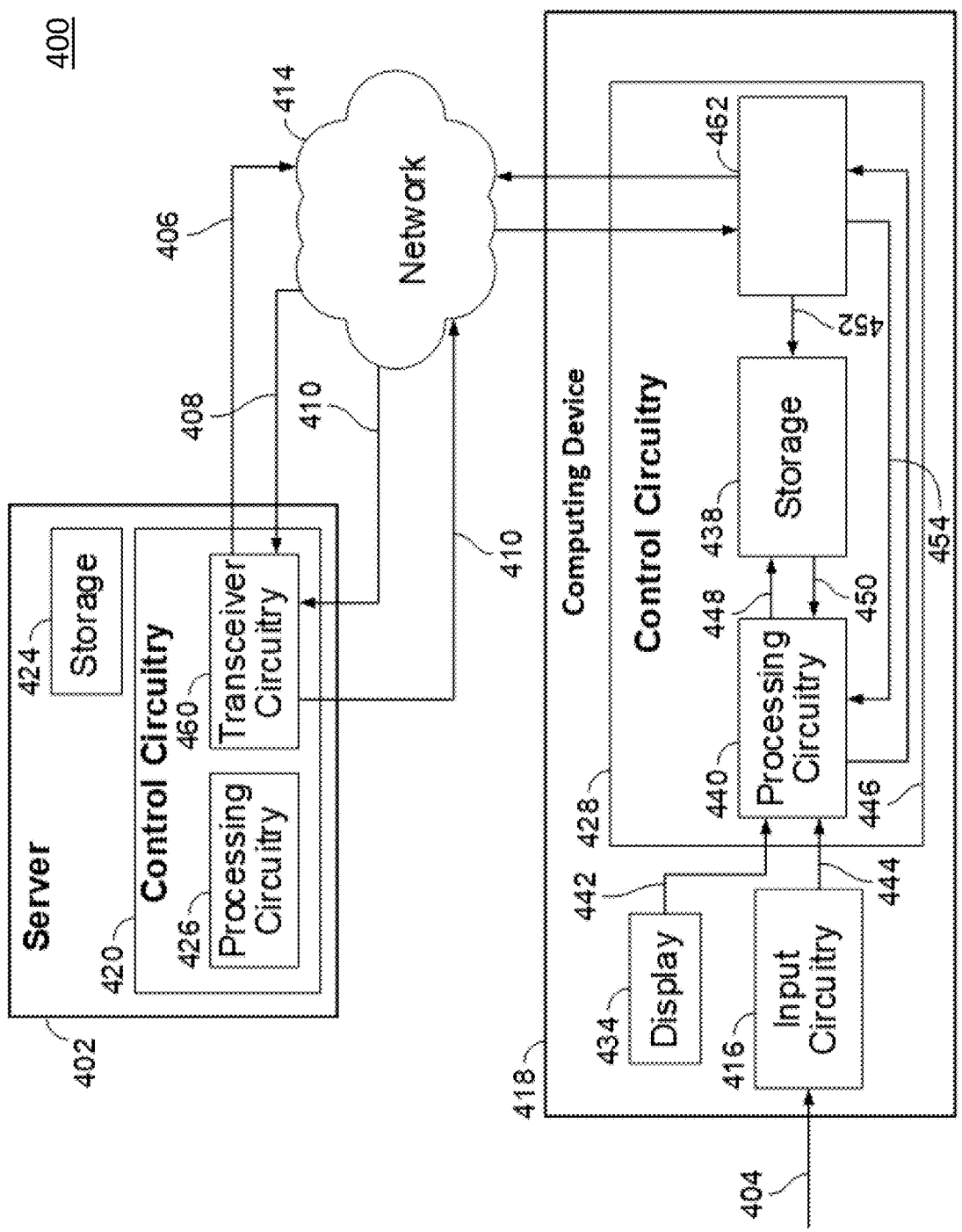
FIG. 4 is a block diagram of an exemplary system for generating secondary content, in accordance with some embodiments of the disclosure.
Figure 5:
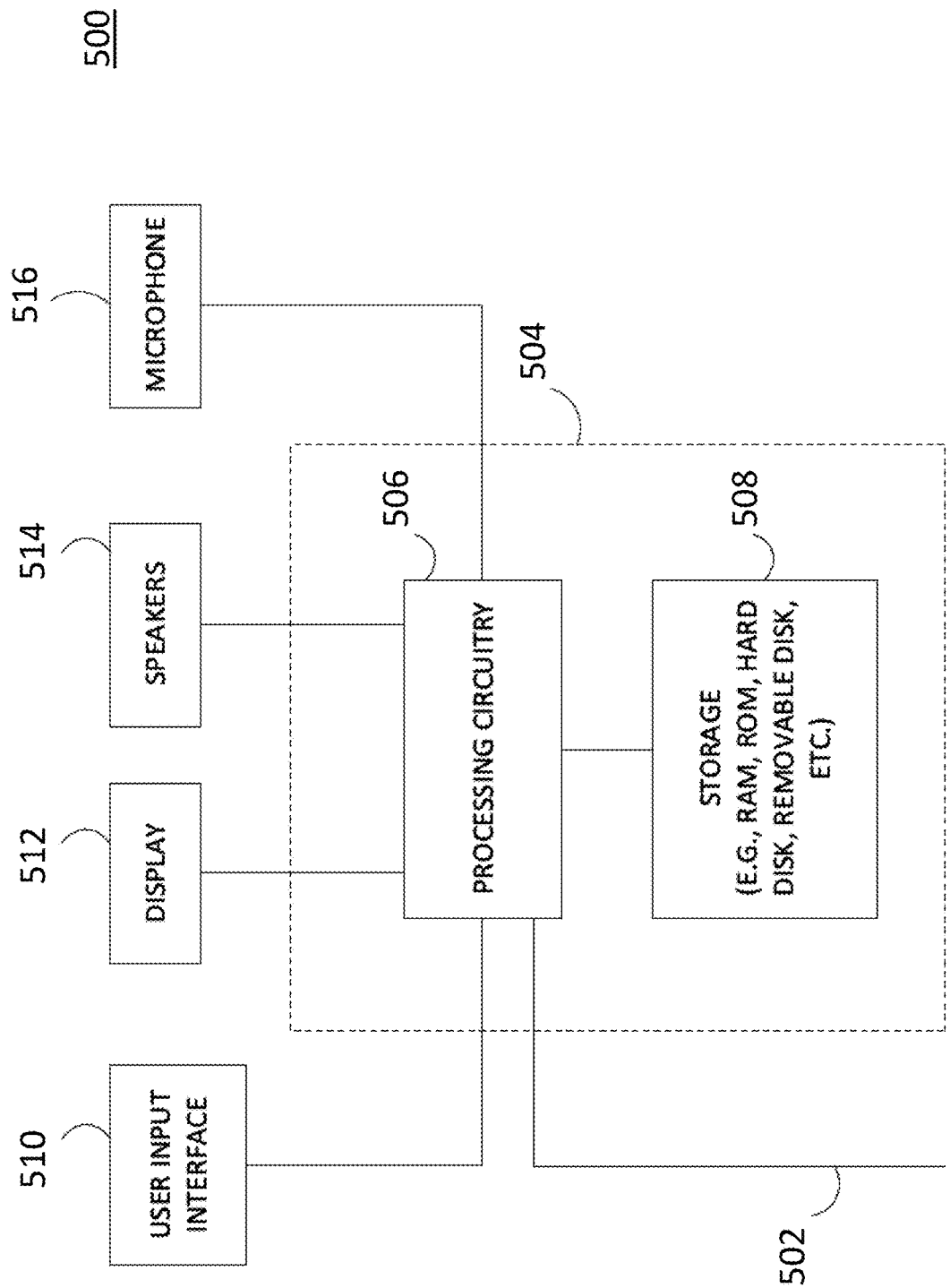
FIG. 5 is a block diagram of a generalized primary device, in accordance with some embodiments of the disclosure.

FIG. 4 is a block diagram of an exemplary system for generating secondary content, in accordance with some embodiments of the disclosure and FIG. 5 is a block diagram of a generalized primary device, in accordance with some embodiments of the disclosure. FIGS. 4 and 5 also describe exemplary devices, systems, servers, and related hardware that may be used to implement processes, functions, and functionalities described in relation to FIGS. 1 and 6.

Further, FIGS. 4 and 5 may also be used for allowing communications between two separate user devices, such as the primary device and the secondary device, such as the AR device. They may also be used to display primary content, capture live real-time content, display webpages or online content, such as shopping platforms and abandoned shopping carts, or receive input from IoT devices. They may also be used receiving primary content, such as a video, and playing it back, tracking the user's interactions with the video, such as user's gaze, user's actions on the video, such as pause, rewind, and play, user's biometric signals, such as heart rate, user's motion, and user's gestures and facial expressions. They may be used capture real-life objects within a field of view of a virtual, augmented, or mixed reality camera and display virtual, augmented, or mixed reality content in a virtual setting. They may also be capable of processing camera, LIDAR, and GPS and IoT device inputs. They may also be used to access webpages, shopping carts, and abandoned carts. They may also be used to determine and analyze the user's interest in frame or an object of the primary content and also determine interest in real-life objects captured via an AR device. They may be able to generate snippets of interest based on the interest in the primary content. They may also be able to utilize vision processors and implement vision detection software and techniques to determine user's gaze and interest. They may also be able to calculate scores for multiple objects of user interest and place them in a table as needed. They may also be used to generate the secondary content that may consist of two portions or parts, where the first portion may be a reminder of the snippet and the second portion may include content that is context specific to the primary object or to both the primary and the real-life object. Additionally, they may be used to implement all the functionality and processes described by the embodiments disclosed in this application.

In some embodiments, one or more parts of, or the entirety of system 400, may be configured as a system implementing various features, processes, functionalities, tables, scores, schedules, user interfaces, and components of FIGS. 1-3, and 6-17. Although FIG. 4 shows a certain number of components, in various examples, system 400 may include fewer than the illustrated number of components and/or multiples of one or more of the illustrated number of components.

System 400 is shown to include a computing device 418, a server 402 and a communication network 414. It is understood that while a single instance of a component may be shown and described relative to FIG. 4, additional instances of the component may be employed. For example, server 402 may include, or may be incorporated in, more than one server. Similarly, communication network 414 may include, or may be incorporated in, more than one communication network. Server 402 is shown communicatively coupled to computing device 418 through communication network 414. While not shown in FIG. 4, server 402 may be directly communicatively coupled to computing device 418, for example, in a system absent or bypassing communication network 414.

Communication network 414 may comprise one or more network systems, such as, without limitation, an internet, LAN, WIFI or other network systems suitable for audio processing applications. In some embodiments, system 400 excludes server 402, and functionality that would otherwise be implemented by server 402 is instead implemented by other components of system 400, such as one or more components of communication network 414. In still other embodiments, server 402 works in conjunction with one or more components of communication network 414 to implement certain functionality described herein in a distributed or cooperative manner. Similarly, in some embodiments, system 400 excludes computing device 418, and functionality that would otherwise be implemented by computing device 418 is instead implemented by other components of system 400, such as one or more components of communication network 414 or server 402 or a combination. In still other embodiments, computing device 418 works in conjunction with one or more components of communication network 414 or server 402 to implement certain functionality described herein in a distributed or cooperative manner.

Computing device 418 includes control circuitry 428, display 434 and input circuitry 416. Control circuitry 428 in turn includes transceiver circuitry 462, storage 438 and processing circuitry 440. In some embodiments, computing device 418 or control circuitry 428 may be configured as media device 500 of FIG. 5.

Server 402 includes control circuitry 420 and storage 424. Each of storages 424 and 438 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 4D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 424, 438 may be used to store various types of content, metadata, and or other types of data (e.g., they can be used to store a user's viewing history or objects of interest). Non-volatile memory may also be used (e.g., to launch a boot-up routine and other instructions). Cloud-based storage may be used to supplement storages 424, 438 or instead of storages 424, 438. In some embodiments, the scores of the objects of interest, frames or the objects of interest, real-life objects, snippets of interest, and audio, textual, and/or video portion of such may be recorded and stored in one or more of storages 412, 438.

In some embodiments, control circuitry 420 and/or 428 executes instructions for an application stored in memory (e.g., storage 424 and/or storage 438). Specifically, control circuitry 420 and/or 428 may be instructed by the application to perform the functions discussed herein. In some implementations, any action performed by control circuitry 420 and/or 428 may be based on instructions received from the application. For example, the application may be implemented as software or a set of executable instructions that may be stored in storage 424 and/or 438 and executed by control circuitry 420 and/or 428. In some embodiments, the application may be a client/server application where only a client application resides on computing device 418, and a server application resides on server 402.

The application may be implemented using any suitable architecture. For example, it may be a stand-alone application wholly implemented on computing device 418. In such an approach, instructions for the application are stored locally (e.g., in storage 438), and data for use by the application is downloaded on a periodic basis (e.g., from an out-of-band feed, from an internet resource, or using another suitable approach). Control circuitry 428 may retrieve instructions for the application from storage 438 and process the instructions to perform the functionality described herein. Based on the processed instructions, control circuitry 428 may determine a type of action to perform in response to input received from input circuitry 416 or from communication network 414. For example, in response to determining that interest in an object exists, the control circuitry 428 may perform the steps of process described in FIGS. 1 and 6 below and all the steps and processes described in all the figures depicted herein.

In client/server-based embodiments, control circuitry 428 may include communication circuitry suitable for communicating with an application server (e.g., server 402) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 414). In another example of a client/server-based application, control circuitry 428 runs a web browser that interprets web pages provided by a remote server (e.g., server 402). For example, the remote server may store the instructions for the application in a storage device. The remote server may process the stored instructions using circuitry (e.g., control circuitry 428) and/or generate displays. Computing device 418 may receive the displays generated by the remote server and may display the content of the displays locally via display 434. This way, the processing of the instructions is performed remotely (e.g., by server 402) while the resulting displays, such as the display windows described elsewhere herein, are provided locally on computing device 418. Computing device 418 may receive inputs from the user via input circuitry 416 and transmit those inputs to the remote server for processing and generating the corresponding displays. Alternatively, computing device 418 may receive inputs from the user via input circuitry 416 and process and display the received inputs locally, by control circuitry 428 and display 434, respectively.

Server 402 and computing device 418 may transmit and receive content and data such as objects, frames, snippets of interest, and input from primary devices and secondary devices, such as AR devices. Control circuitry 420, 428 may send and receive commands, requests, and other suitable data through communication network 414 using transceiver circuitry 460, 462, respectively. Control circuitry 420, 428 may communicate directly with each other using transceiver circuits 460, 462, respectively, avoiding communication network 414.

It is understood that computing device 418 is not limited to the embodiments and methods shown and described herein. In nonlimiting examples, computing device 418 may be a primary device, a personal computer (PC), a laptop computer, a tablet computer, a WebTV box, a personal computer television (PC/TV), a PC media server, a PC media center, a handheld computer, a mobile telephone, a smartphone, or any other device, computing equipment, or wireless device, and/or combination of the same capable of suitably displaying primary content and secondary content.

Control circuitry 420 and/or 418 may be based on any suitable processing circuitry such as processing circuitry 426 and/or 440, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 420 and/or control circuitry 418 are configured to implement a second content generation and processing system, such as systems, or parts thereof, that perform various content display, determination of interest, identification of real-life objects, scoring of interests, generating of secondary content and all processes described and shown in connection with FIGS. 1-3, and 6-17.

Computing device 418 receives a user input 404 at input circuitry 416. For example, computing device 418 may receive a user input like user's gaze, user's heartbeat, user's motion, or some other user engagement with the primary content.

User input 404 may be received from a user selection-capturing interface that is separate from device 418, such as a remote-control device, AR device, trackpad or any other suitable user movement sensitive or capture devices, or as part of device 418, such as a touchscreen of display 434. Transmission of user input 404 to computing device 418 may be accomplished using a wired connection, such as an audio cable, USB cable, ethernet cable or the like attached to a corresponding input port at a local device, or may be accomplished using a wireless connection, such as Bluetooth, WIFI, WiMAX, GSM, UTMS, CDMA, TDMA, 3G, 4G, 4G LTE, or any other suitable wireless transmission protocol. Input circuitry 416 may comprise a physical input port such as a 3.5 mm audio jack, RCA audio jack, USB port, ethernet port, or any other suitable connection for receiving audio over a wired connection or may comprise a wireless receiver configured to receive data via Bluetooth, WIFI, WiMAX, GSM, UTMS, CDMA, TDMA, 3G, 4G, 4G LTE, or other wireless transmission protocols.

Processing circuitry 440 may receive input 404 from input circuit 416. Processing circuitry 440 may convert or translate the received user input 404 that may be in the form of voice input into a microphone, or movement or gestures to digital signals. In some embodiments, input circuit 416 performs the translation to digital signals. In some embodiments, processing circuitry 440 (or processing circuitry 426, as the case may be) carries out disclosed processes and methods. For example, processing circuitry 440 or processing circuitry 426 may perform processes as described in FIGS. 1 and 6, respectively.

FIG. 5 shows a generalized embodiment of a primary equipment device 500, in accordance with one embodiment. In an embodiment, the primary equipment device 500, is the same primary equipment device 402 of FIG. 4. The primary equipment device 500 may receive content and data via input/output (I/O) path 502. The I/O path 502 may provide audio content (e.g., broadcast programming, on-demand programming, internet content, content available over a local area network (LAN) or wide area network (WAN), and/or other content) and data to control circuitry 504, which includes processing circuitry 506 and a storage 508. The control circuitry 504 may be used to send and receive commands, requests, and other suitable data using the I/O path 502. The I/O path 502 may connect the control circuitry 504 (and specifically the processing circuitry 506) to one or more communications paths. I/O functions may be provided by one or more of these communications paths but are shown as a single path in FIG. 5 to avoid overcomplicating the drawing.

The control circuitry 504 may be based on any suitable processing circuitry such as the processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

The communications between two separate user devices, such as the primary device and the secondary device, such as the AR device, the display of primary content, or capturing live real-time content, displaying of webpages or online content, such as shopping platforms and abandoned shopping carts, or receiving of inputs from IoT devices, receiving primary content, such as a video, and playing it back, tracking the user's interactions with the video, such as user's gaze, user's actions on the video, such as pause, rewind, and play, user's biometric signals, such as heart rate, user's motion, and user's gestures and facial expressions, capturing real-life objects within a field of view of a virtual, augmented, or mixed reality camera and displaying virtual, augmented, or mixed reality content in a virtual setting, processing camera, LIDAR, and GPS and IoT device inputs, accessing of webpages, shopping carts, and abandoned carts, determining and analyzing users interest in frame or an object of the primary content and also determining interest in real-life objects captured via an AR device, generating snippets of interest based on the interest in the primary content, utilizing vision processors and implementing vision detection software and techniques to determine user's gaze and interest, calculating scores for multiple objects of user interest and placing them in a table, generating the secondary content that may consist of two portions or parts, where the first portion may be a reminder of the snippet and the second portion may include content that is context specific to the primary object or to both the primary and the real-life object, implementing machine learning (ML) and artificial intelligence (AI) algorithms and all the functionalities discussed associated with the figures mentioned in this application can be at least partially implemented using the control circuitry 504. The processes as described herein may be implemented in or supported by any suitable software, hardware, or combination thereof. They may also be implemented on user equipment, on remote servers, or across both.

In client-server-based embodiments, the control circuitry 504 may include communications circuitry suitable for allowing communications between two separate user devices, such as the primary device and the secondary device, such as the AR device, the display of primary content, or capturing live real-time content, displaying of webpages or online content, such as shopping platforms and abandoned shopping carts, or receiving of inputs from IoT devices, receiving primary content, such as a video, and playing it back, tracking the user's interactions with the video, such as user's gaze, user's actions on the video, such as pause, rewind, and play, user's biometric signals, such as heart rate, user's motion, and user's gestures and facial expressions, capturing real-life objects within a field of view of a virtual, augmented, or mixed reality camera and displaying virtual, augmented, or mixed reality content in a virtual setting, processing camera, LIDAR, and GPS and IoT device inputs, accessing of webpages, shopping carts, and abandoned carts, determining and analyzing users interest in frame or an object of the primary content and also determining interest in real-life objects captured via an AR device, generating snippets of interest based on the interest in the primary content, utilizing vision processors and implementing vision detection software and techniques to determine user's gaze and interest, calculating scores for multiple objects of user interest and placing them in a table, generating the secondary content that may consist of two portions or parts, where the first portion may be a reminder of the snippet and the second portion may include content that is context specific to the primary object or to both the primary and the real-life object, implementing machine learning (ML) and artificial intelligence (AI) algorithms and all related functions and processes as described herein. The instructions for carrying out the above-mentioned functionality may be stored on one or more servers. Communications circuitry may include a cable modem, an integrated service digital network (ISDN) modem, a digital subscriber line (DSL) modem, a telephone modem, ethernet card, or a wireless modem for communications with other equipment, or any other suitable communications circuitry. Such communications may involve the internet or any other suitable communications networks or paths. In addition, communications circuitry may include circuitry that enables peer-to-peer communication of primary equipment devices, or communication of primary equipment devices in locations remote from each other (described in more detail below).

Memory may be an electronic storage device provided as the storage 508 that is part of the control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum-storage devices, gaming consoles, gaming media, or any other suitable fixed or removable storage devices, and/or any combination of the same. The storage 508 may be used to store interest in frames, objects, or snippets, calculated scored for frames, objects, or snippets, indications of real-life objects, ML and AI algorithms, user prior interest and consumption data, secondary content, and all the functionalities and processes discussed herein. Cloud-based storage, described in relation to FIG. 5, may be used to supplement the storage 508 or instead of the storage 508.

The control circuitry 504 may include audio generating circuitry and tuning circuitry, such as one or more analog tuners, audio generation circuitry, filters or any other suitable tuning or audio circuits or combinations of such circuits. The control circuitry 504 may also include scaler circuitry for upconverting and down converting content into the preferred output format of the primary equipment device 500. The control circuitry 504 may also include digital-to-analog converter circuitry and analog-to-digital converter circuitry for converting between digital and analog signals. The tuning and encoding circuitry may be used by the primary equipment device 500 to receive and to display, to play, or to record content. The circuitry described herein, including, for example, the tuning, audio generating, encoding, decoding, encrypting, decrypting, scaler, and analog/ digital circuitry, may be implemented using software running on one or more general purpose or specialized processors. If the storage 508 is provided as a separate device from the primary equipment device 500, the tuning and encoding circuitry (including multiple tuners) may be associated with the storage 508.

The user may utter instructions to the control circuitry 504, which are received by the microphone 516. The microphone 516 may be any microphone (or microphones) capable of detecting human speech. The microphone 516 is connected to the processing circuitry 506 to transmit detected voice commands and other speech thereto for processing. In some embodiments, voice assistants (e.g., Siri, Alexa, Google Home and similar such voice assistants) receive and process the voice commands and other speech.

The primary equipment device 500 may include an interface 510. The interface 510 may be any suitable user interface, such as a remote control, mouse, trackball, keypad, keyboard, touch screen, touchpad, stylus input, joystick, or other user input interfaces. A display 512 may be provided as a stand-alone device or integrated with other elements of the primary equipment device 500. For example, the display 512 may be a touchscreen or touch-sensitive display. In such circumstances, the interface 510 may be integrated with or combined with the microphone 516. When the interface 510 is configured with a screen, such a screen may be one or more monitors, a television, a liquid crystal display (LCD) for a mobile device, active-matrix display, cathode-ray tube display, light-emitting diode display, organic light-emitting diode display, quantum-dot display, or any other suitable equipment for displaying visual images. In some embodiments, the interface 510 may be HDTV-capable. In some embodiments, the display 512 may be a 3D display. The speaker (or speakers) 514 may be provided as integrated with other elements of primary equipment device 500 or may be a stand-alone unit. In some embodiments, the display 512 may be outputted through speaker 514.

The primary equipment device 500 of FIG. 5 can be implemented in system 400 of FIG. 4 as primary equipment device 402, but any other type of user equipment suitable for allowing communications between two separate user devices, such as the primary device and the secondary device, such as the AR device, the display of primary content, or capturing live real-time content, displaying of webpages or online content, such as shopping platforms and abandoned shopping carts, or receiving of inputs from IoT devices, receiving primary content, such as a video, and playing it back, tracking the user's interactions with the video, such as user's gaze, user's actions on the video, such as pause, rewind, and play, user's biometric signals, such as heart rate, user's motion, and user's gestures and facial expressions, capturing real-life objects within a field of view of a virtual, augmented, or mixed reality camera and displaying virtual, augmented, or mixed reality content in a virtual setting, processing camera, LIDAR, and GPS and IoT device inputs, accessing of webpages, shopping carts, and abandoned carts, determining and analyzing users interest in frame or an object of the primary content and also determining interest in real-life objects captured via an AR device, generating snippets of interest based on the interest in the primary content, utilizing vision processors and implementing vision detection software and techniques to determine user's gaze and interest, calculating scores for multiple objects of user interest and placing them in a table, generating the secondary content that may consist of two portions or parts, where the first portion may be a reminder of the snippet and the second portion may include content that is context specific to the primary object or to both the primary and the real-life object, implementing machine learning (ML) and artificial intelligence (AI) algorithms, and all the functionalities discussed associated with the figures mentioned in this application The primary equipment device 500 of any other type of suitable user equipment suitable may also be used to implement ML and AI algorithms, and related functions and processes as described herein. For example, primary equipment devices such as television equipment, computer equipment, wireless user communication devices, or similar such devices may be used. Primary equipment devices may be part of a network of devices. Various network configurations of devices may be implemented and are discussed in more detail below.

Figure 6:
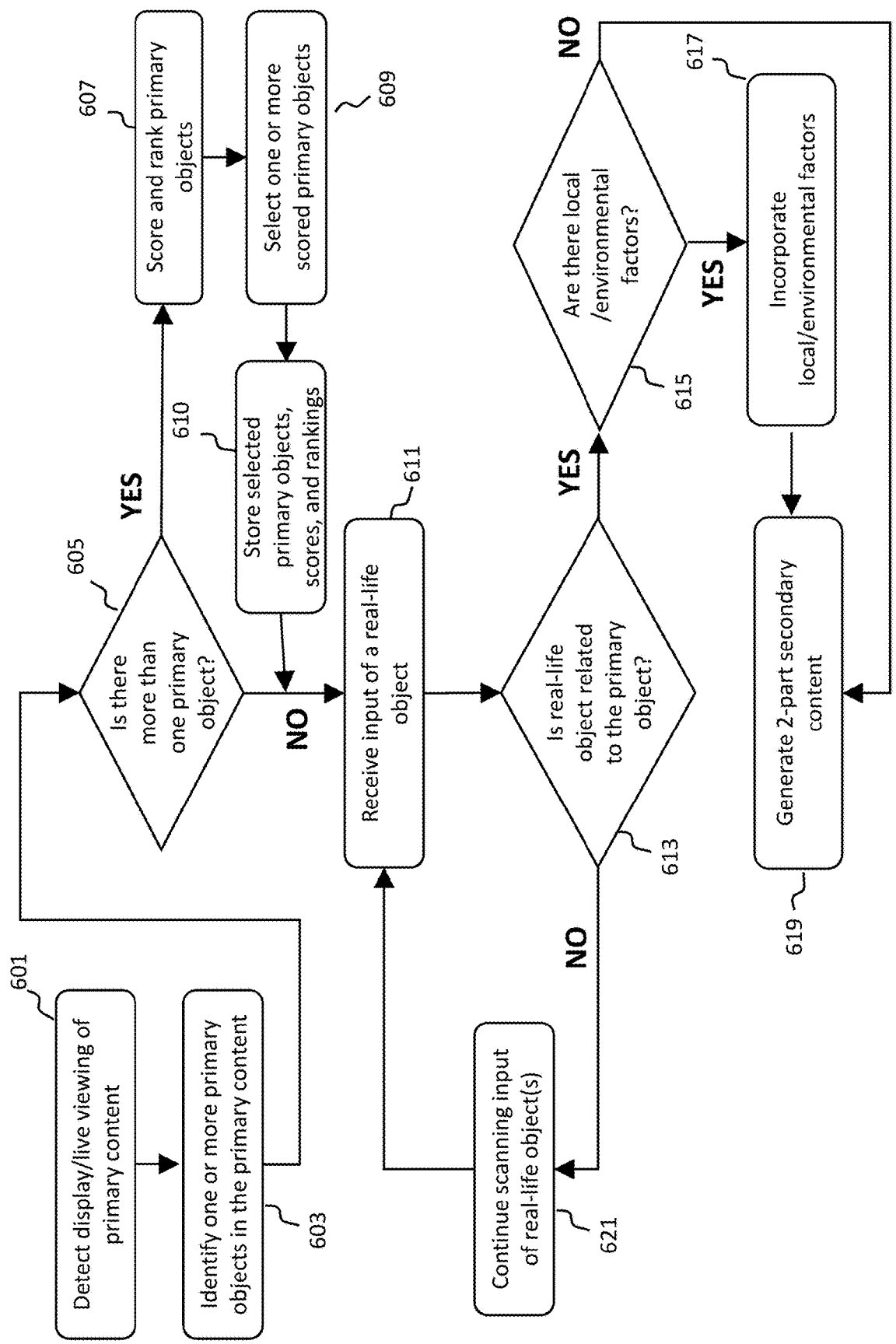
FIG. 6 is flowchart of a process for generating secondary content, in accordance with some embodiments of the disclosure.

FIG. 6 is flowchart of a process for generating secondary content, in accordance with some embodiments of the disclosure. In one embodiment, at block 601, a primary content item is displayed on a primary device. It may also be captured live, such as via live input from a mobile phone or a virtual reality, augmented reality, or mixed reality device, such as a headset or transparent eyeglasses that include one or more cameras. FIG. 6 is discussed further below. The operations described in FIG. 6 may be performed by the control circuitry or the server 402 in FIG. 4 and Ad Server in FIG. 3.

Figure 7:
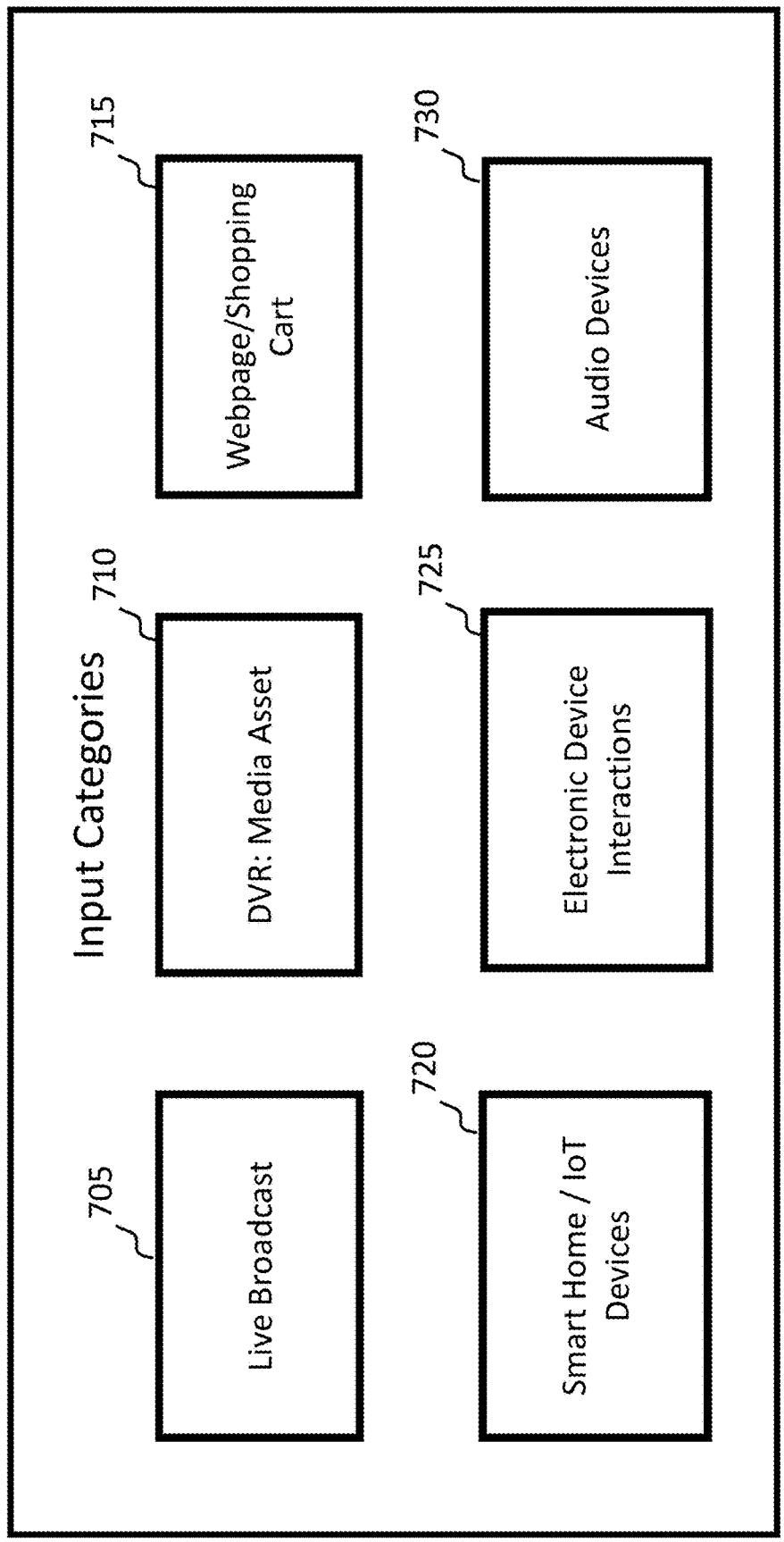
FIG. 7 is a block diagram of input categories for the primary content, in accordance with some embodiments of the disclosure.

The input for the primary content may be received from a plurality of sources. In one embodiment, the plurality of sources or input categories are described in FIG. 7. As depicted in FIG. 7, the primary content may be a live broadcast 705 that can be displayed on the user's primary device. The live broadcast maybe sports, news, or any other live transmission that is part of a live broadcast stream provided to the primary device.

In another embodiment, the input category may be a media asset 710 that is on-demand and that can be played on the user's primary device, such as the device in FIG. 5. The media asset may be any prerecorded media assets such as a movie, documentary, TV show or any other type of programming. The media asset may also be obtained from an on-demand service such as Netflix® or Amazon®. It may also be a personal video, such as a birthday or wedding video, that is locally stored or stored in the cloud. The media asset may also be a clip or video from YouTube® or TikTok™ or a video accessed on an online platform.

In another embodiment, another input source for the primary content may be a webpage 715, an online shopping platform, or an abandoned cart of the online shopping platform. For example, if a user has browsed a website, data from the website, such as a specific page or an item shown on the website, may be used as primary content. Likewise, if the user has browsed an online shopping platform, clicked on an item on the platform, or added items to a shopping cart of the platform and abandoned the shopping cart, such data may also be used as primary content.

In yet another embodiment, another input source for the primary content may be Internet-of-Things (IoT) or smart home devices 720, and data from such devices may be considered to be primary content. For example, voice input to a listening IoT device configured with a digital assistant tool, such as Alexa® provided by Amazon®, or Siri® provided by Apple®, may be used as primary content, such as for block 601 in FIG. 6. For example, in the context of digital assistants, such as Siri® and Alexa®, a voice command/input to an Alexa device may be considered as primary content. Likewise, a response (to the voice input) from the Alexa device may also be considered as primary content. A voice input that says, "Hey Siri, what is the price of the Nike® Shoe 'Air Jordan®' these days?" then such input may be used as primary content and Nike®/® may be used as inputs for a reminder frame based on which a secondary advertisement is subsequently provided to the user. Images, videos, and other data, such as sensing data, obtained by smart home cameras, parking spot cameras, sensors, or devices with sensing abilities can also be used as primary content.

In another example relating to an input device that is a digital assistant, there may be an interaction between the user and the digital assistant, Alexa® provided by Amazon®. Through the interaction, a primary object may be identified, such as based on Alexa's response, either audibly and/or on its display, with a list of restaurant recommendations. At a subsequent time, when the user is walking by one of the restaurants (identified via a wearable virtual device), the system may apply the process of FIG. 6 to determine the relevancy of the real-life object, the restaurant viewed through the wearable device, and trigger the second content to be provided (including perhaps contextual audio of the prior Alexa interaction as the reminder or the first portion of the secondary content).

In yet another example relating to an input device that is a digital assistant, there may be an interaction between the user and the digital assistant, such as Siri® owned by Apple®. Through the interaction, a primary object may be identified. The interaction may include the user asking Siri about a song playing on a Netflix show. In response, Siri identifying the song/band/other context and the system registering the song/band/other context as the primary object. Subsequently when the user hears the song playing while at a store or sees the name of the song depicted somewhere while in the store, where the visual input may be through a virtual wearable device and the audible input may be through a mobile device or a wearable device, the system may apply the process of FIG. 6 to determine the relevancy of the song, or the textual version of the song written somewhere in the store. The system may then provide secondary content (e.g., AR content) relating to a local, upcoming concert by the band. In another scenario, the system may determine that the user is browsing through a ticket purchasing website (such as Ticketmaster™ or Stubhub™) or is physically at a location (a venue box office), and responsively providing the secondary content about the upcoming concert.

Figure 9:
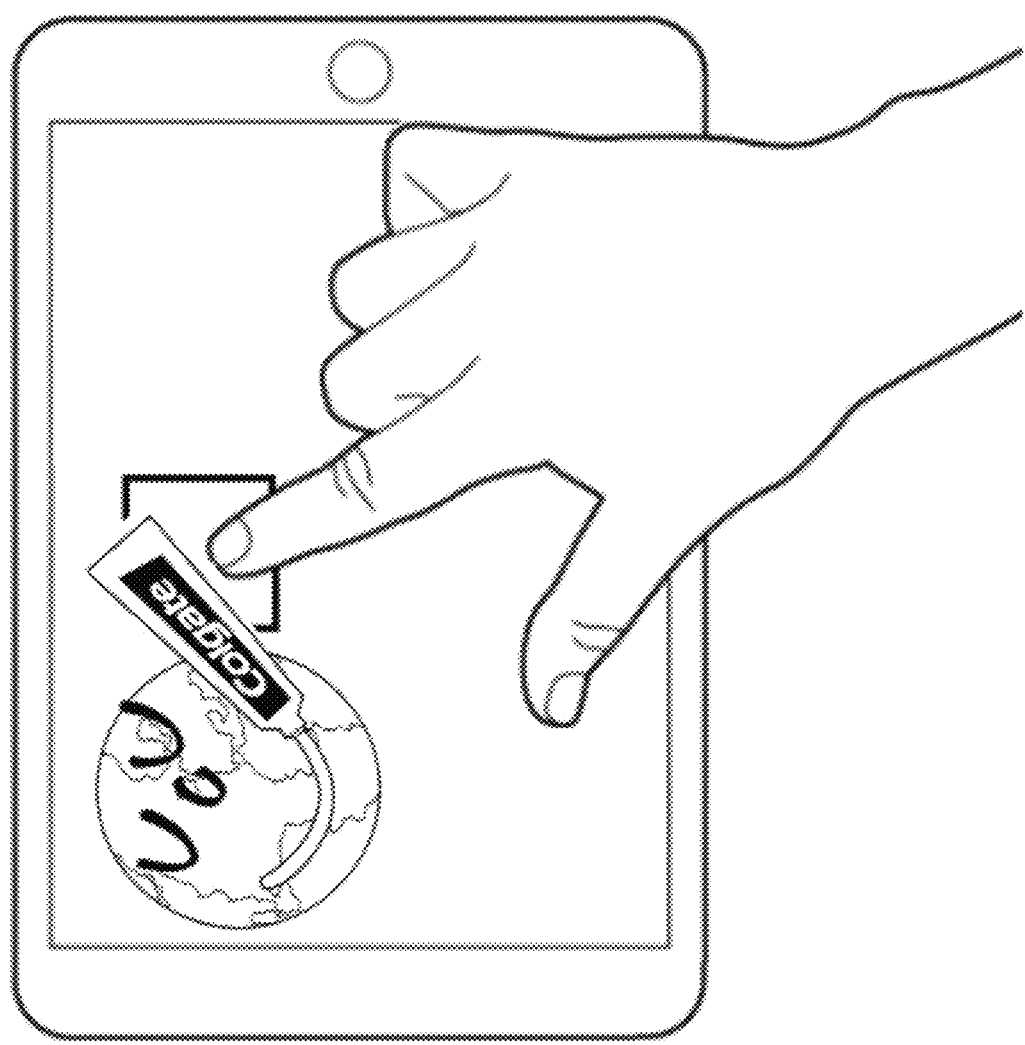
FIG. 9 is an example of a user engagement with a product displayed on the primary device, in accordance with some embodiments of the disclosure.

In yet another embodiment, another input source for the primary content may be based on interactions with displays on the electronic device 725, such as with certain displays, icons, items, tools, applications, etc. For example, selecting of an item with haptic input on a touchscreen as depicted in FIG. 9, selecting or hovering over the item with a mouse, or recent online use of the item may trigger a display on the primary device that is considered as primary content.

In yet another embodiment, another input source for the primary content may be an audio input 730. For example, if the user is alone or with other people, voice inputs may be considered as primary content.

In another embodiment, the primary content may be a live feed seen through transparent virtual reality, augmented reality, or mixed reality eyeglasses that shows a real-time view in its field of vision.

Referring back to FIG. 6, at block 603, the primary input may be analyzed to determine a snippet of interest. There may be multiple methods of determining a user's interest in the primary content. For example, the control circuitry 504 of FIG. 5 may observe and monitor whether and how the user engages with the primary content. When the engagement indicates that the user is interested, the control circuitry may further determine which parts of the primary content are more engaging and interesting to the user than other parts. Some examples of determining engagement with the primary content are described in FIG. 8. These include interactions via an input device such as a mouse click, touch screen selection, keyboard search, etc.

Figure 8:
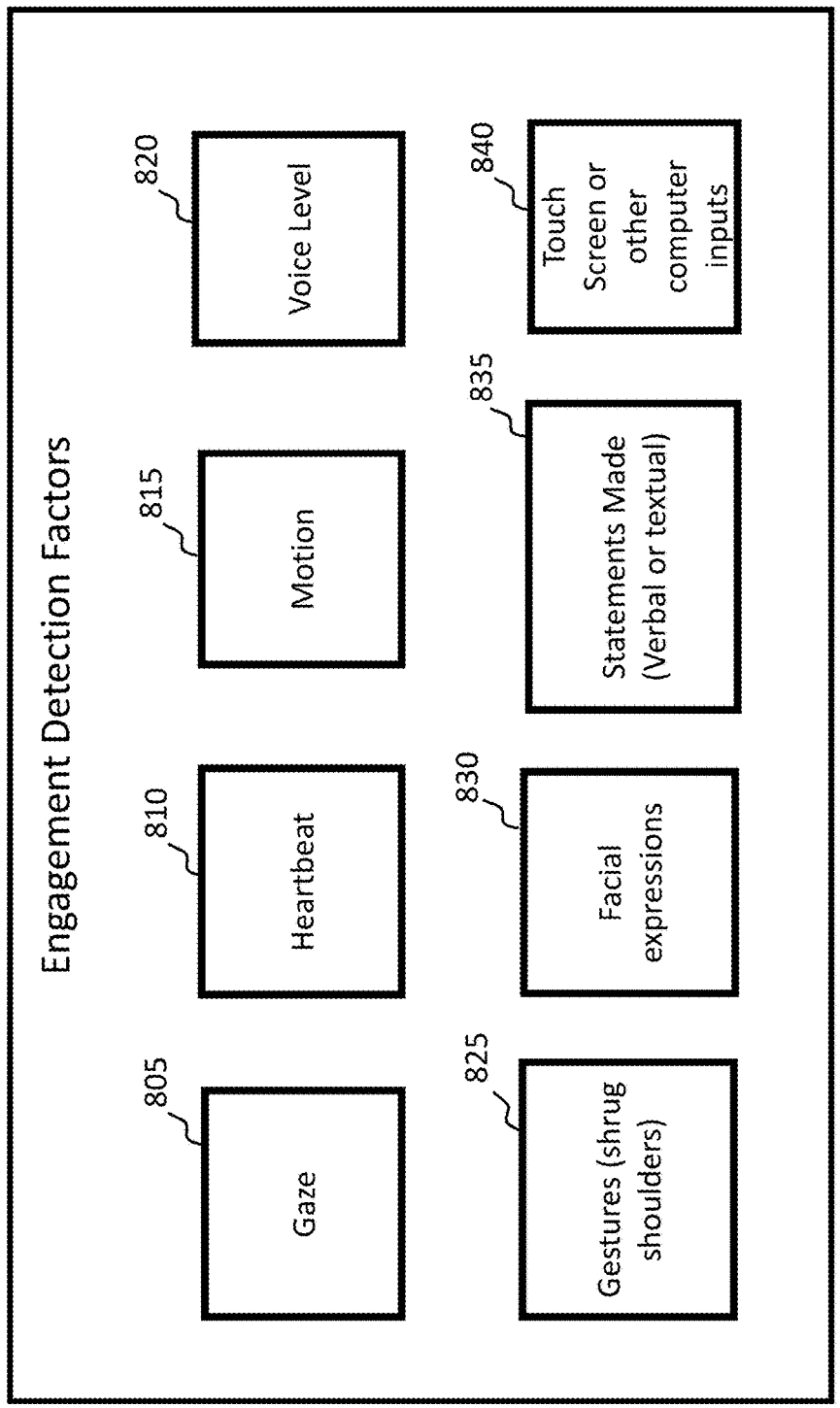
FIG. 8 is a block diagram of engagement detection factors for determining user engagement with primary content, in accordance with some embodiments of the disclosure.

In one embodiment, as depicted in block 805 of FIG. 8, the control circuitry may monitor the user's gaze during the consumption by the user of the primary content to determine a snippet of interest. The user's gaze may be monitored using an inward facing camera of the primary device. Such snippet may be identified based on when the user's gaze is directed towards the particular frame or an object in the particular frame. For example, if the user is staring at an object in the frame or the user's gaze is directed towards the object in the frame for a threshold period of time, such as 2-3 seconds or any other predetermined duration, then the control circuitry may associate such gaze with an interest in the object in the frame. Control circuitry may also monitor for repeated gaze to determine interest in the object or a frame. To determine such engagement, an inward-facing camera may be accessed by the control circuitry to determine the gaze of the user and an eye-tracking mechanism may be deployed to track the eyeball movement to determine if the user is engaged with the primary content and if so, what object or frame of the primary content the eyeballs are directed towards.

In another embodiment, as depicted in block 810, the control circuitry may monitor the user's heart rate to determine if the user is interested in an object or a frame of the primary content. To determine interest based on heart rate, the control circuitry may determine the user's heartbeats. For example, the user may be wearing a smart watch that can monitor the user's heart rate or carrying a mobile device that can measure the user's heart rate. The control circuitry may access such devices and monitor the user's heart rate before and after the user's engagement with the primary content. The control circuitry may monitor the delta between the heart rate before, during, and after the engagement with each frame, and if the heart rate has changed and exceeds a threshold delta, then the control circuitry may determine that the user is interested in the displayed frame or an object within the frame.

In another embodiment, as depicted in block 815, the control circuitry may monitor the user's motion to determine if the user is interested in a particular frame or object in the frame of the primary content. In this embodiment, a gyroscope, motion sensor, or accelerometer associated with a primary device is accessed. The control circuitry may access such gyroscope, motion sensor, or accelerometer to determine the user's body movements before, during, and after engagement with the primary content. Such body movement may be analyzed by the control circuitry, such as by using an AI algorithm, to determine if the movements can be associated with user interest. For example, an individual viewing a certain frame or an object in the frame may react with excitement and gesture as such, with their body thereby being in motion, and such motion may be associated with the user's interest in the frame, object, or some specific part of the primary content that is being displayed.

In another embodiment, as depicted in block 820, the control circuitry may monitor the user's voice levels to determine if the user is interested in a particular frame or object in the frame of the primary content. In this embodiment, the control circuitry may access a microphone of the primary device and keep a record of the user's voice level during the display of the primary content. If the control circuitry notices that the voice level has peaked at a certain stage, then the control circuitry may associate the rise in voice level with the scene being displayed in the primary content with the user being excited about whatever is being displayed.

In another embodiment, as depicted in block 825, the control circuitry may monitor the user's gestures to determine if the user is interested in a particular frame or object in the frame of the primary content. In this embodiment, the control circuitry may access cameras either on the user's primary device or other cameras, such as smart home cameras, that are directed towards the user, and then determine the user's gestures while the user is consuming the primary content. If the control circuitry views any gestures made by the user as being associated with excitement, such as raising hands in excitement, clapping etc., then the control circuitry may use such input as interest in the frame or object displayed in the primary content.

Likewise, as depicted in block 830, the control circuitry may also access cameras either on the primary device, such as the inward-facing camera of a mobile phone, or other cameras, such as smart home cameras, that are directed towards the user, and analyze the facial expressions of the user to determine if the user is interested in a frame or an object in the primary content. For example, a facial expression such as a smile or eyes widened in excitement can be associated with user interest.

Figure 10:
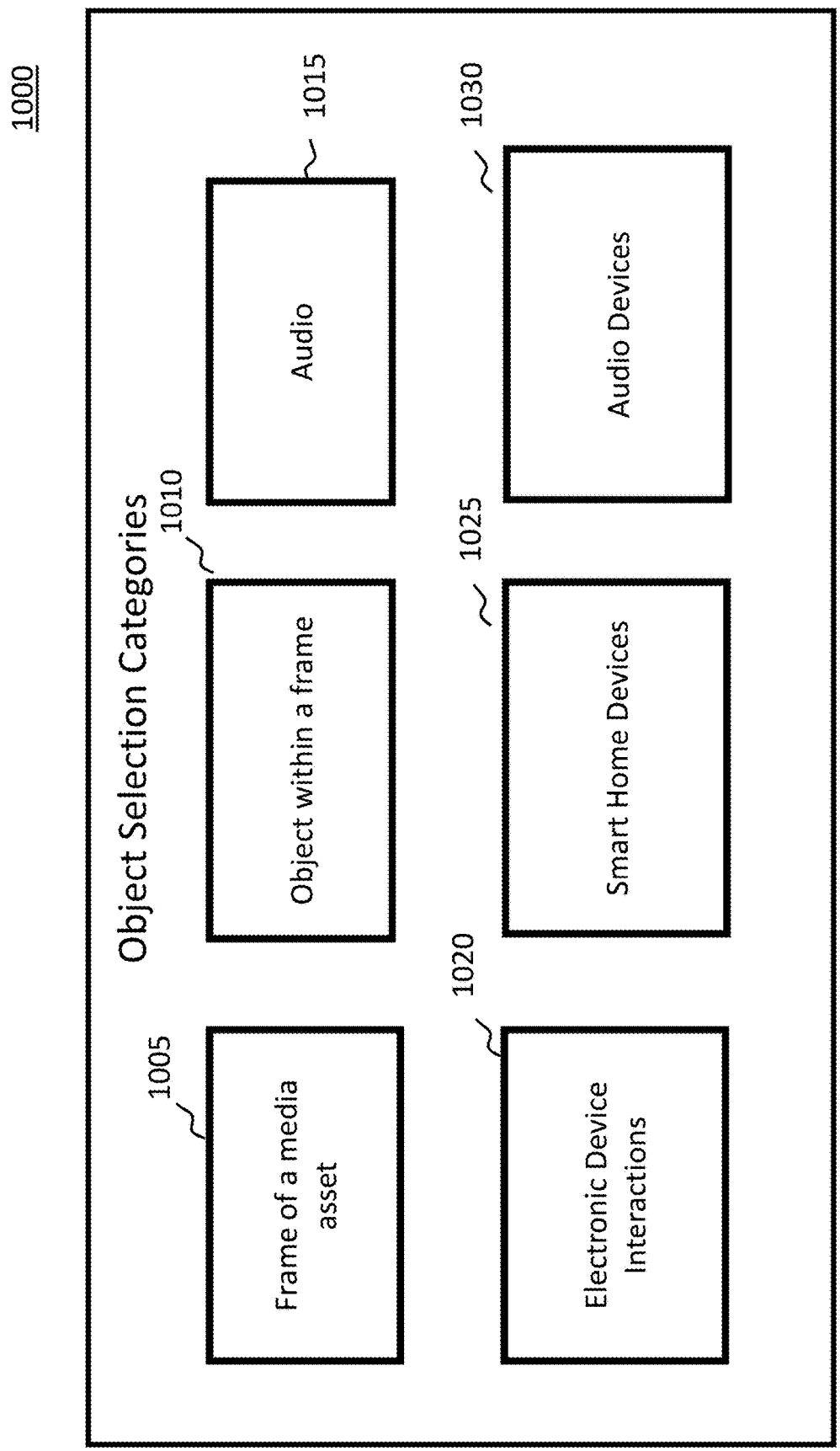
FIG. 10 is a block diagram of object selection categories used in connection with determining user interest in the primary content, in accordance with some embodiments of the disclosure.

In another embodiment, as depicted in block 835, the control circuitry may monitor the user's statements, whether verbal or textual, to determine if the user is interested in a particular frame or object in the frame of the primary content. In this embodiment, the control circuitry may access the user's mobile phone, other wearable devices that have a microphone to monitor the user's voice input, or digital assistant tools such as Alexa™ or Siri™. The control circuitry may continuously or periodically monitor the voice input through the microphone during the display of the primary content to determine if the user makes any statement that can be associated with excitement. For example, words or phrases such as "This is great," "Wow," "So cool," "I love this," and other related statements may be associated with user interest. The control circuitry may use a natural language processing (NLP) algorithm and an artificial intelligence (AI) to analyze the statements made such that it can determine whether such statements may be associated with user interest in a particular frame or object displayed in the frame. The control circuitry may also monitor textual statements by the user such as an SMS or an MMS sent or received by the user using their mobile device or comments made by the user in a post on a social media platform while the user is consuming the primary content. The control circuitry may associate the timing of such text or post with whatever frame of the primary content is being displayed at the time as the user being interested in such frame or an object in the frame. In addition to the above, any interactions expressed in the metaverse can also be associated with user interest in a frame or object in the frame of the primary content. Likewise, any interactions such as in block 835 where a user performs a touch screen operation or hovers over an object with their computer mouse or performs and other computer operation selecting the object can also be associated with user interest in a frame or object in the frame of the primary content. As mentioned above, although a frame or an object in the frame is referred to, as depicted in FIG. 10, the item of interest is not so limited. It can be a frame of a media asset 1005; an object within the frame 1010; an audio clip 1015; an electronic device interaction 1020, such as a hyperlink, webpage, shopping cart, abandoned shopping cart, or selection or clicking of an object; data from a smart home device 1025; and data from an audio device 1030, such as music or audio tapes.

Figure 11:
FIG. 11 is an example of shopping cart on a shopping platform, in accordance with some embodiments of the disclosure.

In one embodiment, an example of a shopping cart that has saved items for later, or in some instances where a shopping cart was populated for purchase and then later is displayed in FIG. 11. Items from such abandoned shopping cart may also be used as input and considered primary content. In the shopping cart scenario, the control circuitry may be provided access to the user's shopping platforms, and it may monitor the user's activities on shopping platforms. The monitoring may include determining which products or services the user has clicked on and which are in the user's shopping cart or abandoned shopping cart. As depicted in FIG. 10, the items saved for later purchase in an Amazon® shopping cart include an Android tablet, Adidas shoes, a Segway scooter, a suit for a young boy, a bicycle, a camping tent, a book related to 100 scientists in history, and other objects.

Referring back to FIG. 6, at block 605, the control circuitry may determine whether more than one primary object or frame of interest has been identified at blocks 601 and 603. In some embodiments, there may be just one frame or one object of interest, and in other embodiments, there may be multiple frames or objects of interest. If a determination is made at block 605 that more than one frame or primary object was determined to be of interest to the user, then, at block 607, the control circuitry may calculate a score for each object of interest. The calculations may be based on characteristics of the gaze of the user, e.g., duration of the gaze, repeated gaze, or gaze that exceeds a predetermined threshold of time. The calculations may also be based on the user's history, such as media asset consumption history and other history associated with user's heartbeat, motion, voice level, gestures, facial expressions, statements made (verbal or textual), social media comments, texts, etc. The calculated scores may be stored in a database, such as in a table.

If a determination is made by the control circuitry that not more than one primary object or frame of interest exists, then the control passes from block 605 directly to block 611.

At block 609, the control circuitry may select one or more objects based on the calculated scores, such as the object with the highest score, the top two objects with the highest scores, or based on some other preferred or programmed method of selection. For simplicity, the description below will be focused on selection of only one object; however, when multiple objects are selected, the same process shall be applied. The only difference between a process for a single object or frame versus multiple objects or frames may be that when there are multiple objects or frames, a score may be calculated to select one of more objects based on the highest scores, and when there is a single object, no scoring may need to be performed. Two examples of this process are depicted below in FIG. 14A for single object and 14B for multiple objects.

In one embodiment, data relating to identifying, scoring, selecting of the primary object(s) from the primary content, such as date from blocks 605-609 are stored in a storage area, as depicted at block 610, such as storage 438 in FIG. 4 of the computing device or storage 424 of the server.

At block 611, the control circuitry may receive an input of a real-life object. The input may be received from a virtual reality, augmented reality, or mixed reality headset or eyeglasses or a mobile phone with AR capabilities. Although all types of computer-based or computer-enhanced realities and reality equipment are contemplated, we will focus on augmented reality (AR) and a secondary device that is AR eyeglasses or an AR headset. However, the same processes shall apply to all other realities and reality equipment.

In some embodiments, the user may be wearing an AR device and, through the camera of the AR device, or a transparent view through a glass, may see a live image, which shows real-life objects. The control circuitry may continuously or periodically scan and capture this live input that is in the field of view of the AR device. In some embodiments, the control circuitry may continue scanning all real-life objects until an object that may be relevant to one of the primary objects is identified. An eye tracker that is associated with the user's AR device may be used to track the user's gaze, to determine which real-life objects seen through the AR device the user's eyeballs are directed towards. Other factors, such as the user's heart rate or motion, may also be used in addition to the user's gaze in determining the user's interest in the real-life objects seen through the camera of the AR device.

The input received at block 611, may occur any time after the primary object has been identified, scored, selected, and stored in the storage area. For example, the input of the real-life object may be received by the control circuitry seconds, minutes, hours, days, weeks or longer after the identification of the primary content and storing of the primary object data (including the reminder snippet). Upon receiving the input of the real-life object, the control circuitry may analyze the one or more real-life object with the stored primary object data to determine whether the real-life object is related to the primary object.

At block 613, the control circuitry may determine a match or relatedness between a selected primary object and the real-life object. Determining a match or determining whether the real-life object is related to the primary object may comprise determining whether the real-life object scanned or inputted is similar to a primary object identified from the primary content that is stored in the storage area. For example, if multiple primary objects of interest were selected, and the object that scored the highest was selected for further processing, then the control circuitry may determine whether the real-life object matches the selected primary object. In another embodiment, instead of determining the match between the scanned real-life objects and the primary object, a match may also be determined if the real-life objects match or are relevant to any part, segment, or portion of the primary content.

The control circuitry may also determine whether the match is a perfect (100%) match or a match that exceeds a minimum match threshold. For example, a predetermined minimum match threshold may be set by the system or the user. In one scenario, if the minimum match required is 70%, if the real-life object matches the primary object by at least 70% then it will act as a trigger to generate a secondary content item.

While reference is made to determining a match between the scanned real-life objects and the primary object, it is also understood that to mean that the real-life object is related to the extracted portion (also referred to as the first part of the secondary content, or reminder snippet). Such determination or relatedness may be performed by the control circuitry, or the server, by comparing attributes from the real-life object with attributes from the extracted portion and determining that the real-life object is related to the extracted portion if the comparison results in exceeding a relevancy threshold.

The relevancy threshold may be set by the sever or Ad author. The relevancy threshold ensure that a minimum percentage of attributes match between the scanned real-life objects and the extracted portion such that it can be established that the scanned real-life object bears some aspect of relevancy to the extracted portion.

At block 615, in response to determining a match between the primary object and the real-life object, the control circuitry may then determine if there are any local and environmental factors that are to be taken into account for generating the secondary content.

At block 617, the control circuitry may incorporate the local and environmental factors described below in connection with FIG. 12. To incorporate environmental and local factors, the control circuitry may access data from resources that provide data relevant to local and environmental changes within a predetermined distance of the user's location. For example, the control circuitry may access weather data, traffic data, local store timings and how busy the store is at the current time etc. Taking such environmental and local factors into account customizes and updates the second portion of the secondary content, making it more appealing to the viewer. For example, a ski vacation advertised in blistering summer may sell well by showing scenes of cold and snow, whereas the same ski vacation advertised in the cold or during winter may sell well by showing scenes of hot chocolate in the ski lodge. Likewise, local consideration of the user's circumstances, such as location, busy times, pricing, or membership status may be taken into account in generating the combined secondary content. For example, one store being less busy than another store, or one store being closer or having less traffic to get through to reach, one store having the same product in the user's size or having a lower price, one store awarding more reward points, or one store being a higher-paying advertiser may be some of the factors considered in determining how to adjust the secondary content for the user.

In one embodiment blocks 615 and 617 may be performed either before or after block 619. For example, after the 2-part secondary content is generated, it may be adjusted for local/environmental factors.

Figure 12:
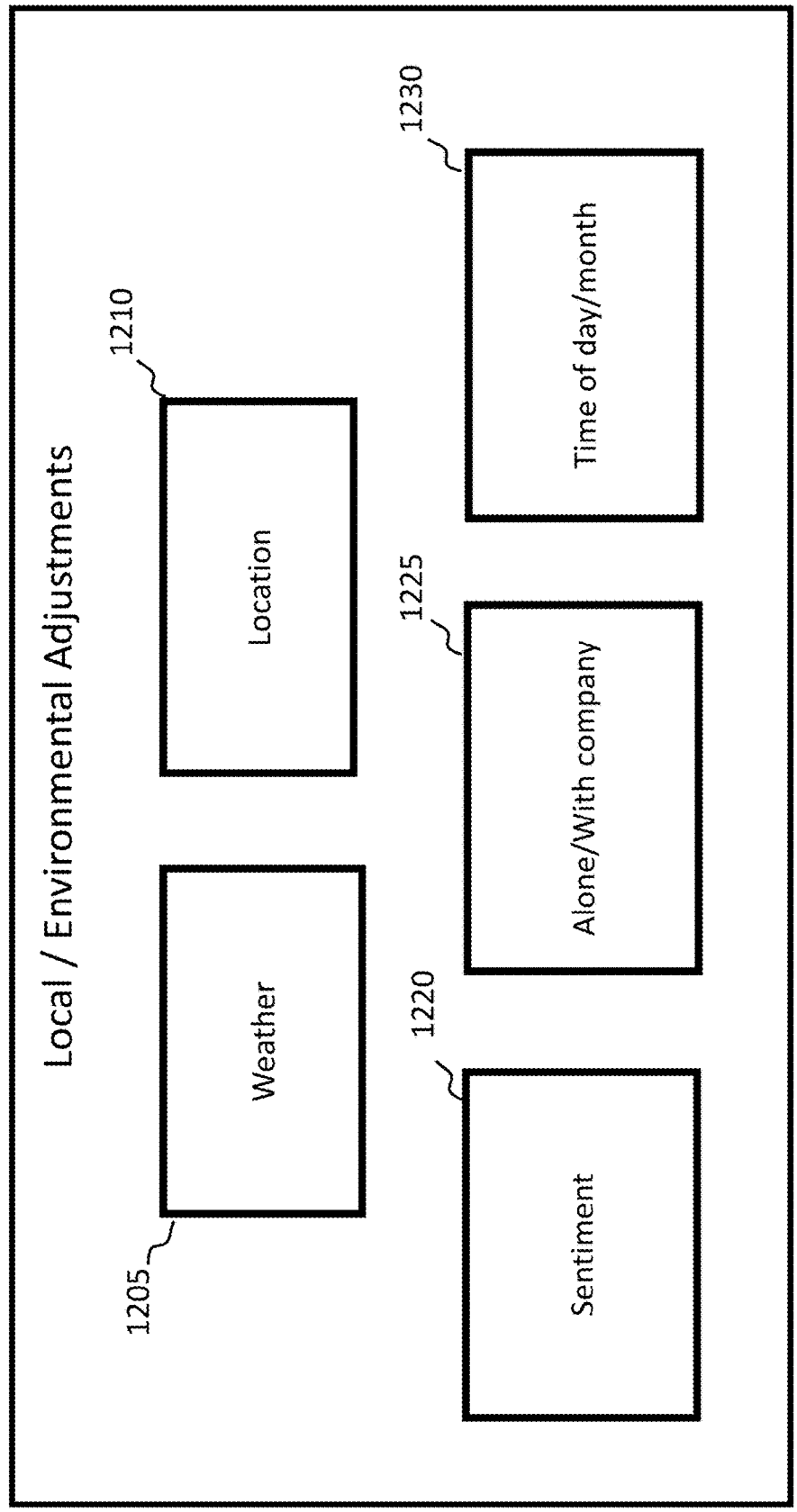
FIG. 12 is a block diagram of local and environments adjustment categories for adjusting the secondary content, in accordance with some embodiments of the disclosure.

In one embodiment, some of the environmental or local factors may include factors depicted in FIG. 12, such as weather 1205, location 1210, current activity near the user's location 1215, sentiment 1220, whether the user is alone or with people 1225, and the time of the day/month 1230.

As depicted in block 1205, the control circuitry may account for the weather in generating the secondary content. For example, the control circuitry may determine which secondary content or embellishment to the secondary content maybe more attractive to the user based on the surrounding weather. For example, as mentioned above, a ski vacation advertised in blistering summer may sell well by showing scenes of cold and snow, whereas the same ski vacation advertised in the cold or during winter may sell well by showing scenes of hot chocolate in the lodge.

As depicted in block 1210, the control circuitry may account for the location in generating the secondary content. For example, different types of secondary content, or embellishments to the secondary content, may be used if a user is in New York, Chicago, Rome, or Mumbai. The control circuitry may also take into account different cultural appropriateness in different regions, types of locations such as quiet or busy locations, whether there is traffic, and other local considerations in generating or embellishing the secondary content. For example, if the control circuitry determines that route to a store that sells the product of interest has an accident along the highway and it is easier to get to another store, such as another Home Depot™, to get the same product, then such location consideration will be accounted for in generating the secondary content.

As depicted in block 1220, the control circuitry may account for the user's emotion or sentiment in generating the secondary content. For example, if the control circuitry determines that the user is in a good mood, a different type of secondary content, or an embellishment to the secondary content, may be generated as opposed to the user being in a bad mood. Such sentiment may be determined based on using the AI algorithm to analyze statements or facial expressions of the user and associate them with different sentiments. The AI algorithm may analyze the statement, facial expression, and/or gestures to determine whether they are positive or a negative, and such data may be taken into account when suggesting the secondary content.

As depicted in block 1225, the control circuitry may determine whether the user is alone or with people in generating the secondary content. The control circuitry may suggest different secondary content when the user is alone as opposed to when the user is with other people. For example, content that must be seen in a private setting may not be sent to the user as secondary content when the user is with other people. Likewise, in another example, with respect to secondary content that involves a busy restaurant, the control circuitry may suggest that restaurant when the user is alone, because the likelihood of getting a table is higher. When the user is with a large group of people, a different, less busy restaurant may be suggested in the secondary content.

As depicted in block 1230, the control circuitry may consider time of day, week, or month in generating the secondary content. Secondary content that may be appealing in the morning may not be appealing to the same user in the evening. For example, breakfast-related items may not be sent as secondary content if the time of the day is afternoon or evening. Likewise, weekend activity-related items may not be sent during weekdays.

In addition to the above, environmental and local factors may also include a weather change, for example, when the weather change includes a change in temperature that exceeds a predetermined temperature threshold value within a predetermined threshold of time, a change in precipitation that exceeds a threshold value, and/or a change in wind velocity that exceeds a threshold value, a traffic update, or a local emergency that involves police, fire, or medical attention.

Referring back to FIG. 6, at block 619, the control circuitry generates or obtains a secondary content that is customized based on the primary object of interest and the user's live interactions with real-life objects. In one embodiment, the secondary content may consist of two portions or parts. The first portion may be a reminder of the snippet from the primary content obtained through the primary electronic device. The second portion may include content that is context-specific to the primary object or to both the primary and the real-life object. The secondary content may be suitable for augmented reality. It may include a combination of user-specific reminder snippets or primary objects along with a product, service, information, an advertisement, a metaverse product, service, game, or other context-specific secondary snippets, media assets, advertisements, websites, internet links provided by the creator of the primary content, generated by the control circuitry, or obtained from third-party resources such as an advertisement server.

Figure 13:
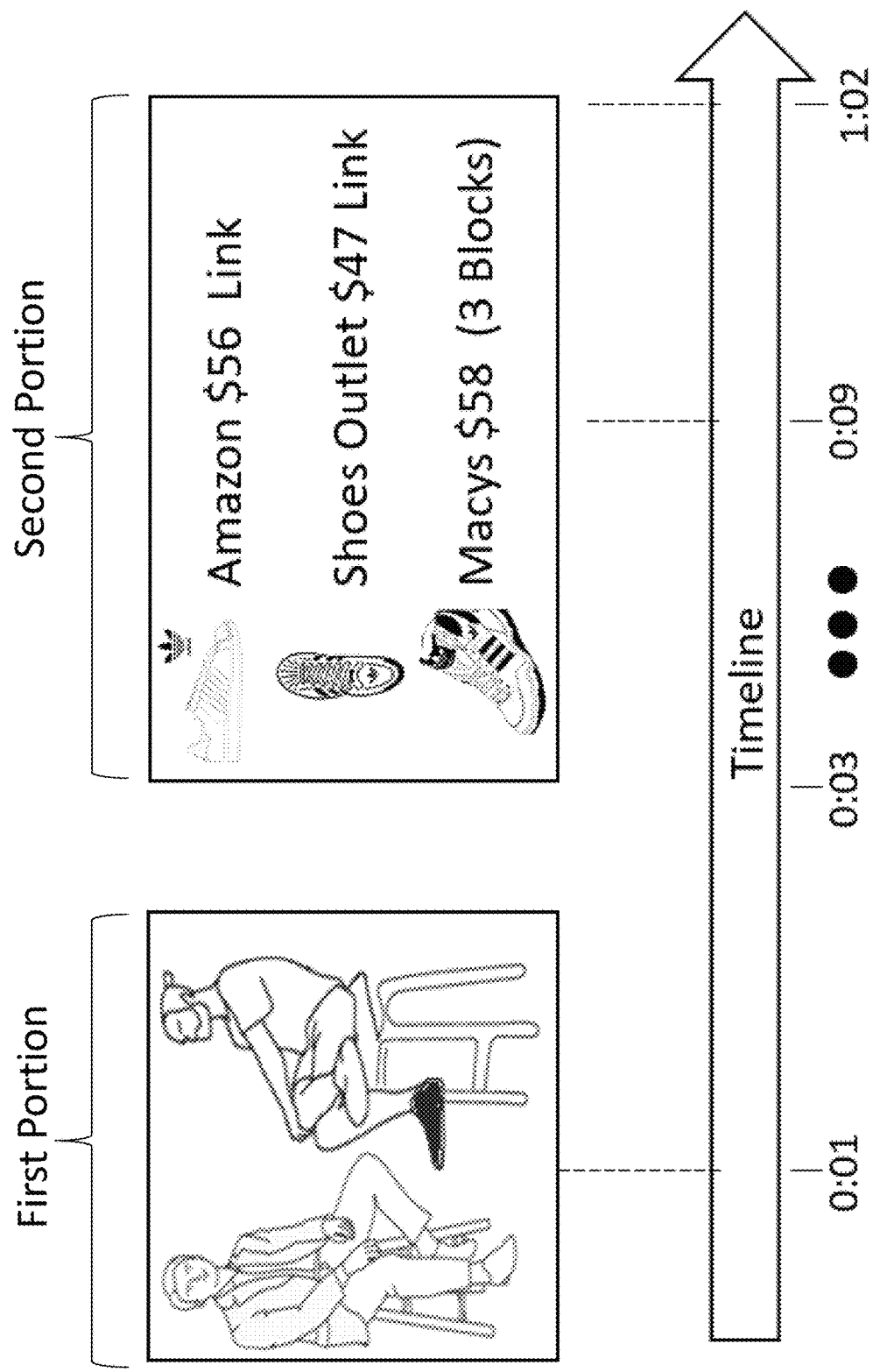
FIG. 13 is an example of secondary content having two portions, in accordance with some embodiments of the disclosure.

One example of a secondary object is depicted in FIG. 13. In this embodiment, the secondary content is a one-minuteand-two-seconds (1:02) video clip. The start of the video clip includes a reminder frame where the user originally showed interest in the Adidas shoes. Subsequently, when the user may have been walking around with an AR device and they may have seen a person playing soccer wearing a similar type of Adidas shoes. The real-life Adidas shoe may have been captured by the AR device's camera and matched with the shoe from the primary content. Upon determining a match, the server, such as the server 201 in FIG. 2, may generate secondary content or obtain it from an advertisement author 203 or a third-party source. The secondary content may comprise two portions that are sequential and stitched together such that they may be viewed as one piece of content. As depicted, the first portion of the secondary content is a reminder snippet that includes the object of interest from the primary video, which was the Adidas shoes. The second part contains hyperlinks to different online platforms as well as a physical store that is close to the user's current location, where different types of related Adidas shoes can be bought by the user. The secondary content may be a video clip or a static page as well and may come in different formats, such as picture-in-picture or side-by-side frames.

Referring back to FIG. 6, at block 621, in response to determining that the real-life object does not relate to the primary object, the control circuitry may continue scanning live input for real-life objects until a real-life object that matches the primary object is detected, the secondary device is powered off, or scanning mode is turned off.

FIG. 15 is a sample data structure for generating the secondary content, in accordance with some embodiments of the disclosure. The data structure shows different stages of the process described in FIGS. 1 and 6 and the data structures involved in each stage. These stages include the primary content stage, the real-life object stage, the matching stage, and the secondary content generation stage.

The data structure relating to the primary content stage includes frame numbers, scene numbers associated with the frame, objects displayed in the frame, and whether any interest is detected for that particular frame.

The data structure relating to the real-life object stage includes description of the real-life object detected, description of the scene associated with the real-life object, and location details relating to the real-life scene. Other descriptions and data structures for the real-life object stage may also exist, such as data structures for implementing real-life detection, visualization, and processing, the functions of which are disclosed in FIGS. 1 and 6; however, such data structures are not displayed for the sake of simplification.

The matching stage includes a data structure relating to the match between the primary object and the real-life object. The secondary content stage includes a data structure for generating the secondary content and updating or embellishing the secondary content based on local and environmental factors.

As depicted in the data structure table 1500, frame 1 is associated with scene A and does not include any objects. As such, no processing is performed to determine interest in the objects or matching with the real-life objects.

Frame 2, as depicted in table 1500, is associated with scene B, and objects "Polo jacket, Hat, Winter wear, Car, Houses, and Snow." The control circuitry monitoring user engagement with the objects displayed in the primary content concluded that there is no user interest in the displayed objects. As such, the data structure for interest detected is null. FIG. 16 displays an example of such a scenario in frame 2, where the primary content being consumed is a scene of a family walking in their neighborhood with snow all around them and houses and a car in the background. The associated column for interest in the objects detected, which are "Polo jacket, Hat, Winter wear, Car, Houses, and Snow," shows no interest from the user consuming the primary content.

Frame 3, as depicted in table 1500, is associated with scene C, and object "Gucci Bag." The control circuitry monitoring user engagement with the Gucci bag displayed in frame 3 as the primary content concluded that there is interest of the user in the Gucci bag. As such, the data structure for interest detected is populated as "Yes." The real-life data structures relating to the frame 3/scene C had identified real-life objects that were "Umbrella, Beach, and Volleyball," none of which are related to the object identified in the primary content as of user interest, the Gucci Bag. As such, although other real-life data for scene and location are collected, the data structure relating to matching is null, since there does not exist a match between the primary object data structure and the real-life object data structures.

Frame 4, as depicted in table 1500, is associated with scene D, and object "Red Patagonia jacket." The control circuitry monitoring user engagement with the objects displayed in the primary content, i.e., the red Patagonia jacket, concluded that there is interest of the user in the Patagonia jacket. As such, the data structure for interest detected is populated. FIG. 16 displays an example of such a scenario in frame 4 where the primary content being consumed is a scene of a boy wearing a red Patagonia object and the associated column for Objects of Interest includes the snippet of the objects of interest. The real-life object structure shows that control circuitry detected a "blue Patagonia jacket, kids, school playground." The data structures relating to the real-life scene and the real-life location associated with the real-life object is also populated as "kid playing in school playground," and "Gold Street, San Jose," respectively. Although there is a difference between the red Patagonia jacket in the primary content data structure and the blue Patagonia jacket in the real-life object data structure, the data structure relating to matching concluded that there is a match. In another embodiment, the data structure may have an additional column indicating the percentage of match, such as a perfect (100%) match, or a match that exceeds a predetermined match or relevancy percentage threshold. Upon the data structure relating to matching concluding a match, the data structure related to secondary content is populated and the secondary content is generated.

Frame 5, as depicted in table 1500, is associated with scene E, and objects "Wilson Basketball and Jordan #23 T-shirt." The control circuitry monitoring user engagement with the Wilson basketball and Jordan #23 T-shirt displayed in frame 5 concluded that there is interest of the user in both the Wilson basketball and Jordan #23 shirt. As such, the data structure for interest detected is populated. The real-life object structure shows that control circuitry detected a real-life object "Jogger, Jordan #23 shirt, and ear pods." Data structure fields associated with the scene and the location were also populated. Since the match between the primary objects and real-life objects is only for the Jordan #23 shirt, the secondary data structure created is associated with the Jordan #23 shirt and not the other primary objects, i.e., Wilson basketball, that were not detected in the real-life data structures.

Figure 17:
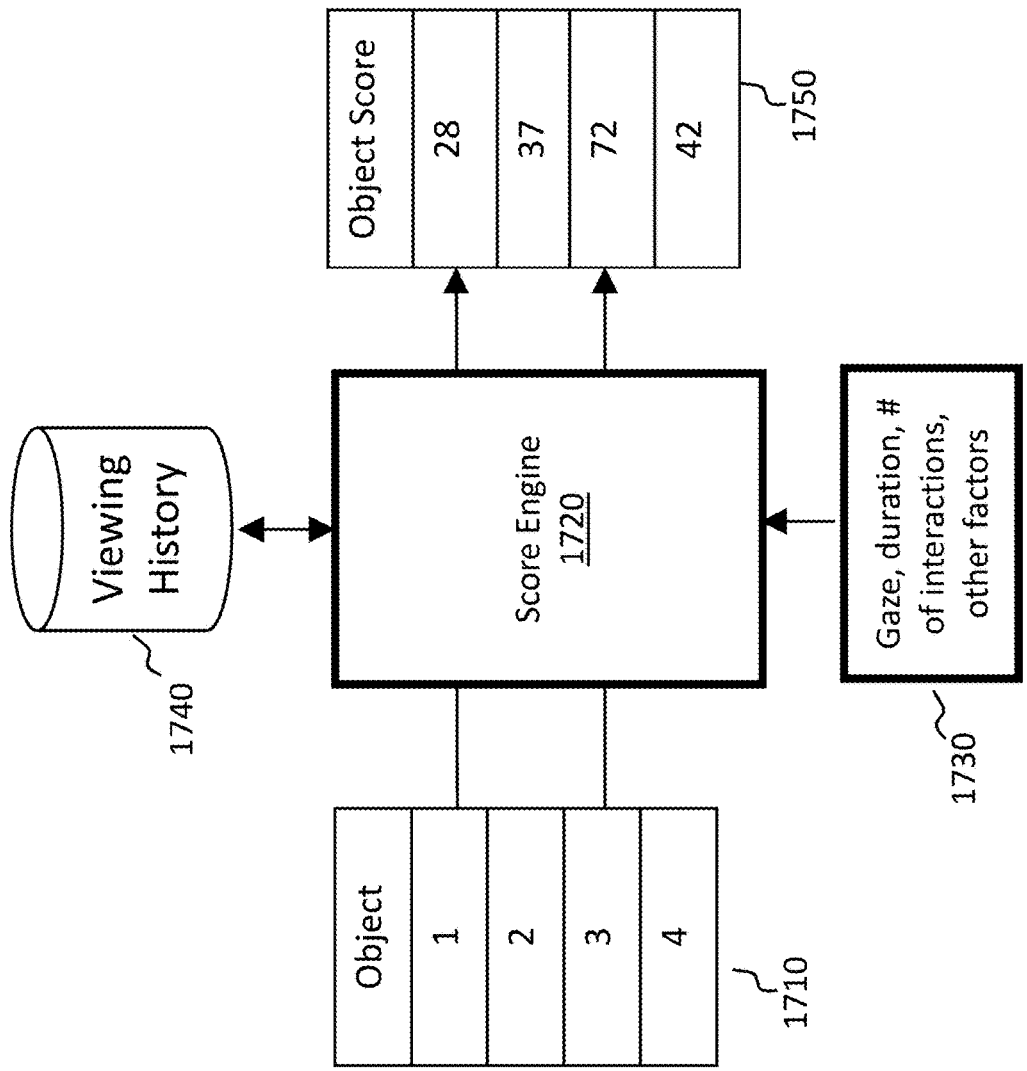
FIG. 17 depicts a scoring engine and process applied for scoring multiple objects of interest, in accordance with some embodiments of the disclosure.

FIG. 17 is a scoring engine used in connection with scoring multiple objects of interest, according to some embodiments of the disclosure. In one embodiment, the control circuitry may have detected four (4) objects of interest during the display of the primary content. The objects of interest may have been determined based on the user's gaze, heartbeat detection, motion, voice level changes and other factors as described in the discussion of FIG. 8.

The score engine may take inputs from user interactions with the object as well as inputs from viewing history to calculate the score for each of the four objects that were determined to be of interest in the primary content. The inputs from the user interaction may include the gaze of the user towards the object, the duration of the gaze, the number of interactions, repeated gaze, and other factors as discussed in FIG. 8. The input from the viewing history may include prior interest shown in the same or similar objects by the user. The scoring engine may take such inputs and calculate the overall score for each object. In one embodiment, the score may be just a summation of all the interactions and viewing history for each object of interest. In other embodiments, a predetermined formula may be used to calculate the overall score. As depicted, object 1 received an overall score of 28, object 2 received an overall score of 37, object 3 received an overall score of 72, and object 4 received an overall score of 42.

It will be apparent to those of ordinary skill in the art that methods involved in the above-mentioned embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    receiving an image including one or more real-life objects, wherein the image is received via a camera of a mixed reality, virtual reality, or augmented reality device;
    determining, by a server, that the one or more real-life objects match an aspect of a primary content;
    based at least in part on determining that the one or more real-life objects match the aspect of the primary content:
        identifying, by the server, an extracted portion from the primary content, the extracted portion obtained based at least in part on input received by the server that is indicative of user interest during consumption of the primary content on a primary electronic device;
        generating, by the server, a secondary content comprising a combination of:
            (a) a reminder frame associated with the extracted portion; and
            (b) supplemental content related to the extracted portion, wherein the reminder frame and the supplemental content are stitched together to provide an appearance of a single piece of content; and
    providing, by the server, the secondary content for presentation as an augmented reality object in association with the one or more real-life objects.

2. The method of claim 1, further comprising:
    displaying the primary content item on a display screen of the primary electronic device, wherein the primary content item includes a plurality of frames or objects;
    using an inward facing camera of the primary electronic device to monitor gaze of a user associated with the primary electronic device;
    determining that a primary frame or primary object, from the plurality of frames or objects, is a frame or object of interest based on whether the user's gaze is directed towards the displayed frame or object; and
    identifying the determined primary frame or object within the determined primary frame for extracting as the extracted portion of the primary content.

3. The method of claim 2, wherein monitoring the user's gaze using the inward-facing camera further comprises continuously monitoring the user's gaze during the display of the plurality of frames or objects to determine the primary frame or primary object at which the user's gaze is directed for a threshold period of time.

4. The method of claim 1, wherein the extracted portion obtained based at least in part on the input indicative of user interest is obtained from one or more of a) a frame or an object in the frame displayed on the primary content item, b) a live image captured in real-time via a primary camera of the primary electronic device, c) a displayed webpage, d) an abandoned shopping cart of an online shopping platform, e) an image or video from an Internet-of-things (IoT) device, f) an audio input received by the primary electronic device, or g) an input to or a response from a digital assistant.

5. The method of claim 1, wherein the receiving the image including the one or more real-life objects further comprises using an outward-facing camera associated with the mixed reality, virtual reality, or augmented reality device to receive the one or more real-life objects in real-time.

6. The method of claim 1, wherein the determining that the one or more real-life objects match the aspect of the primary content further comprises:
    determining attributes of the one or more real-life objects;
    comparing the determined attributes of the one or more real-life objects with attributes of a primary object from the extracted portion;
    determining that the attribute comparison exceeds a relevancy threshold value; and
    determining a match between the one or more real-life objects and the primary object.

7. The method of claim 6, further comprising, in response to determining that the attribute comparison does not exceed the relevancy threshold value, determining that a match between the one or more real-life objects and the primary object does not exist.

8. The method of claim 1, wherein the identifying, by the server, the extracted portion from the primary content further comprises:
    accessing an online account associated with a user;
    determining that the online account includes an object of interest in an abandoned shopping cart; and identifying the extracted portion that includes the object of interest from the abandoned shopping cart.

9. The method of claim 1, wherein the identifying, by the server, the extracted portion from the primary content further comprises:
accessing an IoT device located within a threshold distance of a user, wherein the IoT device is capable of receiving video and audio input of the user;
obtaining data from the IoT device to determine user interest in a primary object; and
identifying the extracted portion that includes the primary object of interest.

10. The method of claim 1, further comprising:
determining that the extracted portion from the primary content item includes a plurality of frames or objects of user interest;
calculating a score for each of the plurality of frames or objects of user interest;
selecting a primary frame or primary object, from the plurality of frames or objects, based on the calculated score; and
identifying the extracted portion that includes the selected primary frame or object of interest.

11. The method of claim 1, further comprising:
determining a location of the primary electronic device;
determining that a local or environmental event is occurring or will occur within a predetermined threshold of time within a predetermined distance from the location of the primary electronic device; and
in response to determining that the local or environmental event is occurring or will occur within the predetermined threshold of time within the predetermined distance from the location of the electronic device:
adjusting the supplemental content of the secondary content to accommodate for the local or environmental event.

12. The method of claim 11, wherein the environmental event relates to a weather change, wherein the weather change includes change in temperature where the change exceeds a temperature threshold value within a predetermined threshold of time, change in precipitation where the change exceeds a precipitation threshold value, and change in wind velocity where the change exceeds a wind velocity threshold value.

13. A system comprising:
a server configured to:
receive an image including one or more real-life objects, wherein the image is received via a camera of a mixed reality, virtual reality, or augmented reality device;
determine that the received one or more real-life objects match an aspect of a primary content;
based at least in part on determining that the one or more real-life objects match the aspect of the primary content, the sever configured to:
identify an extracted portion from the primary content, the extracted portion obtained based at least in part on input indicative of user interest during consumption of the primary content on a primary electronic device;
generate a secondary content comprising a combination of:
(a) a reminder frame associated with the extracted portion; and
(b) supplemental content related to the extracted portion, wherein the reminder frame and the supplemental content are stitched together to provide an appearance of a single piece of content; and
provide the secondary content for presentation as an augmented reality object in association with the one or more real-life objects.

14. The system of claim 13, wherein the server is further configured to:
display the primary content item on a display screen of the primary electronic device, wherein the primary content item includes a plurality of frames or objects;
use an inward facing camera of the primary electronic device to monitor gaze of a user associated with the primary electronic device;
determine that a primary frame or primary object, from the plurality of frames or objects, is a frame or object of interest based on whether the user's gaze is directed towards the displayed frame or object; and
identify the determined primary frame or object within the determined primary frame for extracting as the extracted portion of the primary content.

15. The system of claim 13, wherein the server is further configured to monitor the user's gaze using the inward-facing camera by continuously monitoring the user's gaze during the display of the plurality of frames or objects to determine the primary frame or primary object at which the user's gaze is directed for a threshold period of time.

16. The system of claim 13, wherein the extracted portion obtained based at least in part on the input indicative of user interest is obtained from any one of a) a frame or an object in the frame displayed on the primary content item, b) a live image captured in real-time via a primary camera of the primary electronic device, c) a displayed webpage, d) an abandoned shopping cart of an online shopping platform, e) an image or video from an Internet-of-things (IoT) device, f) an audio input received by the primary electronic device, or g) an input to or a response from a digital assistant.

17. The system of claim 13, wherein the server is further configured to determine that the one or more real-life objects match the aspect of the primary content by:
determining attributes of the one or more real-life objects;
comparing the determined attributes of the one or more real-life objects with attributes of a primary object from the extracted portion;
determining that the attribute comparison exceeds a relevancy threshold value; and
determining a match between the one or more real-life objects and the primary object.

18. The system of claim 13, wherein the server is further configured to identify the extracted portion from the primary content by:
accessing an online account associated with a user;
determining that the online account includes an object of interest in an abandoned shopping cart; and
identifying the extracted portion that includes the object of interest from the abandoned shopping cart.

19. The system of claim 13, wherein the server is further configured to identify the extracted portion from the primary content by:
accessing an IoT device located within a threshold distance of a user, wherein the IoT device is capable of receiving video and audio input of the user;
obtaining data from the IoT device to determine user interest in a primary object; and
identifying the extracted portion that includes the primary object of interest.

20. The system of claim 13, further comprising, the server configured to:
- determine a location of the primary electronic device;
- determine that a local or environmental event is occurring or will occur within a predetermined threshold of time within a predetermined distance from the location of the primary electronic device; and
- in response to determining that the local or environmental event is occurring or will occur within the predetermined threshold of time within the predetermined distance from the location of the electronic device:
  - adjust the supplemental content of the secondary content to accommodate for the local or environmental event.

21. The system of claim 20, wherein the environmental event relates to a weather change, wherein the weather change includes change in temperature where the change exceeds a temperature threshold value within a predetermined threshold of time, change in precipitation where the change exceeds a precipitation threshold value, and change in wind velocity where the change exceeds a wind velocity threshold value.

\* \* \* \* \*